(12) United States Patent
Blumenfeld

(10) Patent No.: US 11,092,345 B2
(45) Date of Patent: Aug. 17, 2021

(54) CENTRAL SOLAR WATER HEATER SYSTEM FOR A MULTI STORY BUILDING

(71) Applicant: Moshe Blumenfeld, Beer-Sheva (IL)

(72) Inventor: Moshe Blumenfeld, Beer-Sheva (IL)

( * ) Notice: Subject to any disclaimer, the term of this patent is extended or adjusted under 35 U.S.C. 154(b) by 882 days.

(21) Appl. No.: 15/688,121

(22) Filed: Aug. 28, 2017

(65) Prior Publication Data

US 2018/0128497 A1 May 10, 2018

Related U.S. Application Data

(63) Continuation-in-part of application No. 14/508,948, filed on Oct. 7, 2014, now Pat. No. 9,772,120.

(60) Provisional application No. 61/961,173, filed on Oct. 7, 2013.

(51) Int. Cl.
*F24D 11/00* (2006.01)
*F24D 3/00* (2006.01)

(52) U.S. Cl.
CPC ............ *F24D 11/003* (2013.01); *F24D 3/005* (2013.01); *F24D 11/005* (2013.01); *Y02B 10/20* (2013.01)

(58) Field of Classification Search
CPC ..................................................... F24D 11/005
See application file for complete search history.

(56) References Cited

U.S. PATENT DOCUMENTS

| | | | |
|---|---|---|---|
| 2,575,478 A | 11/1951 | Wilson | |
| 3,517,151 A | 6/1970 | Mekjean | |
| 4,085,731 A | 4/1978 | Weir | |
| 4,109,858 A * | 8/1978 | Moses | F24D 11/005 237/8 R |
| 4,283,914 A | 8/1981 | Allen | |
| 4,323,054 A * | 4/1982 | Hummel | F24S 80/30 126/631 |
| 4,338,917 A | 7/1982 | Keller | |
| 5,217,000 A | 6/1993 | Pierce-Bjorklund | |
| 10,373,085 B1 * | 8/2019 | Baghdikian | G06Q 30/0208 |

(Continued)

FOREIGN PATENT DOCUMENTS

| | | |
|---|---|---|
| CN | 101319821 | 12/2008 |
| CN | 100582587 | 1/2010 |
| CN | 202393022 | 8/2012 |

OTHER PUBLICATIONS

International Search Report and Written Opinion in connection with International Patent Application No. PCT/US2014/595767, dated Dec. 17, 2014.

*Primary Examiner* — Avinash A Savani
*Assistant Examiner* — Deepak A Deean

(57) ABSTRACT

A system for supplying hot water to a floor of a building having a plurality of floors is disclosed. The system includes a hot water vessel operable to supply hot water for use in the floor of the building, the hot water vessel having an inlet for receiving cold water and a heating coil for transferring heat to water within the hot water vessel. The system also includes a heat exchanger having an outlet in liquid communication with the inlet of the hot water vessel, the heat exchanger being operable to collect stagnant heat within the floor and to preheat cold water flowing through the heat exchanger for delivery to the inlet of the hot water vessel. A hot water supply system for a plurality of apartments in a multi-story building having at least one exterior solar-facing wall exposed to solar radiation and a fire sprinkler supply system for a building are also disclosed.

12 Claims, 17 Drawing Sheets

(56) References Cited

U.S. PATENT DOCUMENTS

| | | | |
|---|---|---|---|
| 2002/0017110 A1* | 2/2002 | Chiu | F24F 1/42 |
| | | | 62/305 |
| 2005/0022871 A1 | 2/2005 | Acker | |
| 2008/0209907 A1 | 9/2008 | Xiao et al. | |
| 2010/0300645 A1* | 12/2010 | Glover | F24D 11/003 |
| | | | 165/48.1 |
| 2011/0108018 A1 | 5/2011 | Heinsohn et al. | |
| 2011/0179726 A1* | 7/2011 | Pao | H02S 20/25 |
| | | | 52/173.3 |
| 2011/0259613 A1* | 10/2011 | Morris | A62C 35/64 |
| | | | 169/16 |
| 2012/0160303 A1* | 6/2012 | Pao | F24S 20/67 |
| | | | 136/251 |
| 2013/0328322 A1* | 12/2013 | Julian | F01K 25/10 |
| | | | 290/1 R |
| 2015/0096554 A1* | 4/2015 | Blumenfeld | F24D 19/1042 |
| | | | 126/714 |

\* cited by examiner

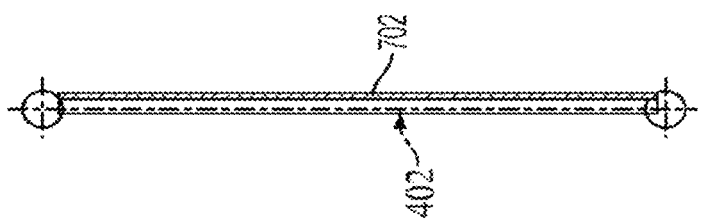
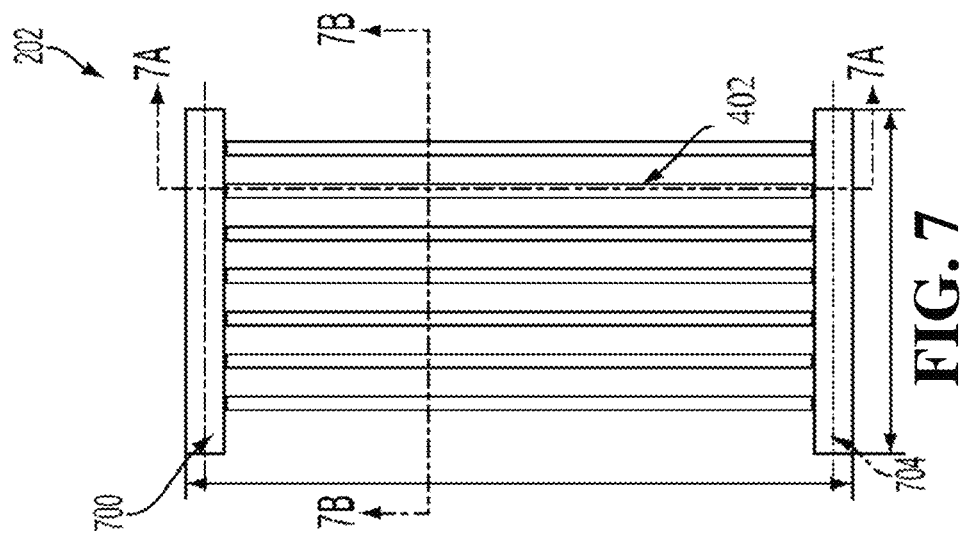
FIG. 7B
FIG. 7A
FIG. 7

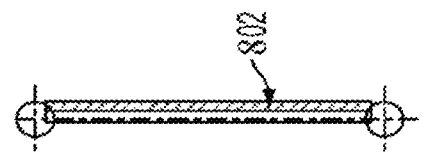
FIG. 8A
FIG. 8B
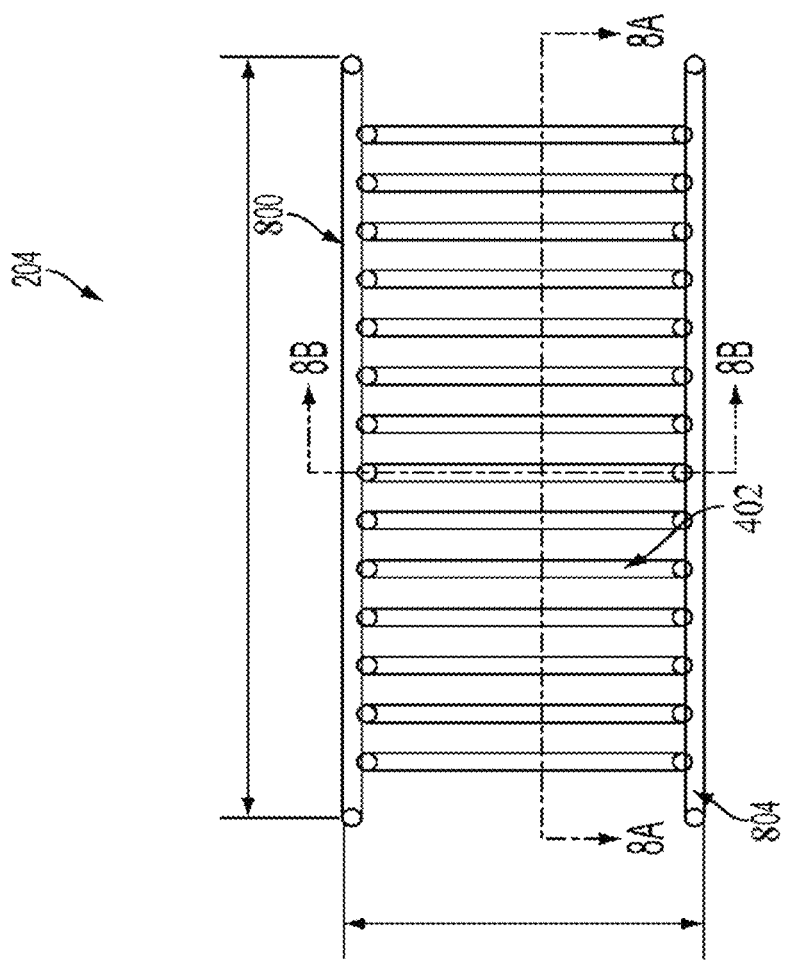
FIG. 8

CENTRAL SOLAR WATER HEATER SYSTEM FOR A MULTI STORY BUILDING

BACKGROUND

1. Field

Aspects of the present disclosure relate to solar heating, and more particularly to solar water heating in residential multi-story buildings.

2. Description of Related Art

The industry of solar water heating is more than fifty years old. Existing solar water heating systems are not suitable for high buildings because the roof area per apartment diminishes proportionally as the number of floors increase, and the distance between the solar collectors and the storage hot water vessels increase proportionally as the number of floors increase.

These two reasons diminish the efficiency of solar water heating with systems based on solar collectors positioned on the roof of multi-story buildings.

SUMMARY

A system for solar fluid heating in a multi-story building may include solar collectors installed in solar-facing walls of the multi-story building, in which fluid receives thermal energy from the plurality of solar collectors. Such a system also includes fluid storage vessels. The system further includes a circulating pump coupled to the solar collectors to circulate the heated fluid between the solar collectors and the fluid storage vessels on a story (floor) of the multi-story building.

A method for solar fluid heating in a multi-story building may involve receiving solar energy at solar collectors installed in solar-facing walls of the multi-story building. Such a method may further involve transferring the solar energy as thermal energy through a heating fluid. The method also involves circulating the heated fluid between the solar collectors and fluid storage vessels on a floor of the multi-story building.

An apparatus for solar fluid heating in a multi-story building may include means for receiving thermal energy installed in solar-facing walls of the multi-story building, in which fluid receives a solar energy from the plurality of solar collectors. Such an apparatus may also include means for transferring the solar energy as thermal energy through a heating fluid. The apparatus also includes means for circulating the heated fluid between the solar collectors and fluid storage vessels on a floor of the multi-story building.

In accordance with another disclosed aspect there is provided a system for supplying hot water to a floor of a building having a plurality of floors. The system includes a hot water vessel operable to supply hot water for use in the floor of the building, the hot water vessel having an inlet for receiving cold water and a heating coil for transferring heat to water within the hot water vessel. The system also includes a heat exchanger having an outlet in liquid communication with the inlet of the hot water vessel, the heat exchanger being operable to collect stagnant heat within the floor and to preheat cold water flowing through the heat exchanger for delivery to the inlet of the hot water vessel.

In accordance with another disclosed aspect there is provided a hot water supply system for a plurality of apartments in a multi-story building having at least one exterior solar-facing wall exposed to solar radiation. The system includes a solar collector disposed on the solar-facing wall and operable to transfer heat to a heating fluid in response to receiving solar radiation at the solar collector, the solar collector further including photovoltaic cells operably configured to generate electrical energy. The system also includes a plurality of hot water vessels, each hot water vessel being operable to supply hot water to one apartment in the plurality of apartments, each hot water vessel having a respective heating coil for transferring heat to water within the hot water vessel. The system also includes a fluid circulating system operable to circulate the heating fluid between the solar collector and the respective heating coils of each of the plurality of hot water vessels, and an electrical energy distribution system for distributing electrical energy generated by the solar collector to the benefit of each apartment in the plurality of apartments.

In accordance with another disclosed aspect there is provided a fire sprinkler supply system for a building. The system includes a hot water vessel operable to supply hot water for use in the building, the hot water vessel having an air inlet in fluid communication with the hot water vessel and a cold water inlet connected to a cold water supply line. The system also includes at least one fire sprinkler circuit connected to the cold water supply line via a sprinkler supply valve, and a fire detection sensor operably configured to generate a fire condition signal in response to increased temperature caused by a fire condition in the building. The fire condition signal is operable to open the sprinkler supply valve to place the sprinkler circuit in fluid communication with the water supply line and the cold water inlet of the hot water vessel. The system further includes an air compressor operably configured to selectively supply pressurized air to the hot water vessel through the air inlet in response to receiving the fire condition signal from the fire detection sensor, the pressurized air being operable to cause water in the hot water vessel to be supplied through the cold water inlet and the water supply line to the sprinkler circuit via the sprinkler supply valve, the hot water vessel having capacity to supply a greater flow of water to the fire sprinkler circuit than could be supplied by the cold water supply line.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

Other aspects and features will become apparent to those ordinarily skilled in the art upon review of the following description of specific disclosed embodiments in conjunction with the accompanying figures.

BRIEF DESCRIPTION OF THE DRAWINGS

For a more complete understanding of the present disclosure, reference is now made to the following description taken in conjunction with the accompanying drawings;

FIG. 7 illustrates a detailed view of a first type of solar collector in accordance with an aspect of the present disclosure;

FIG. 7A is a cross-sectional view of the solar collector shown in FIG. 7 taken along the line 7A-7A;

FIG. 7B is a cross-sectional view of the solar collector shown in FIG. 7 taken along the line 7B-7B;

FIG. 8 illustrates a detailed view of a second type of solar collector in accordance with an aspect of the present disclosure;

FIG. 8A is a cross-sectional view of the solar collector shown in FIG. 8 taken along the line 8A-8A;

FIG. 8B is a cross-sectional view of the solar collector shown in FIG. 8 taken along the line 8B-8B;

DETAILED DESCRIPTION

Figure 1A:
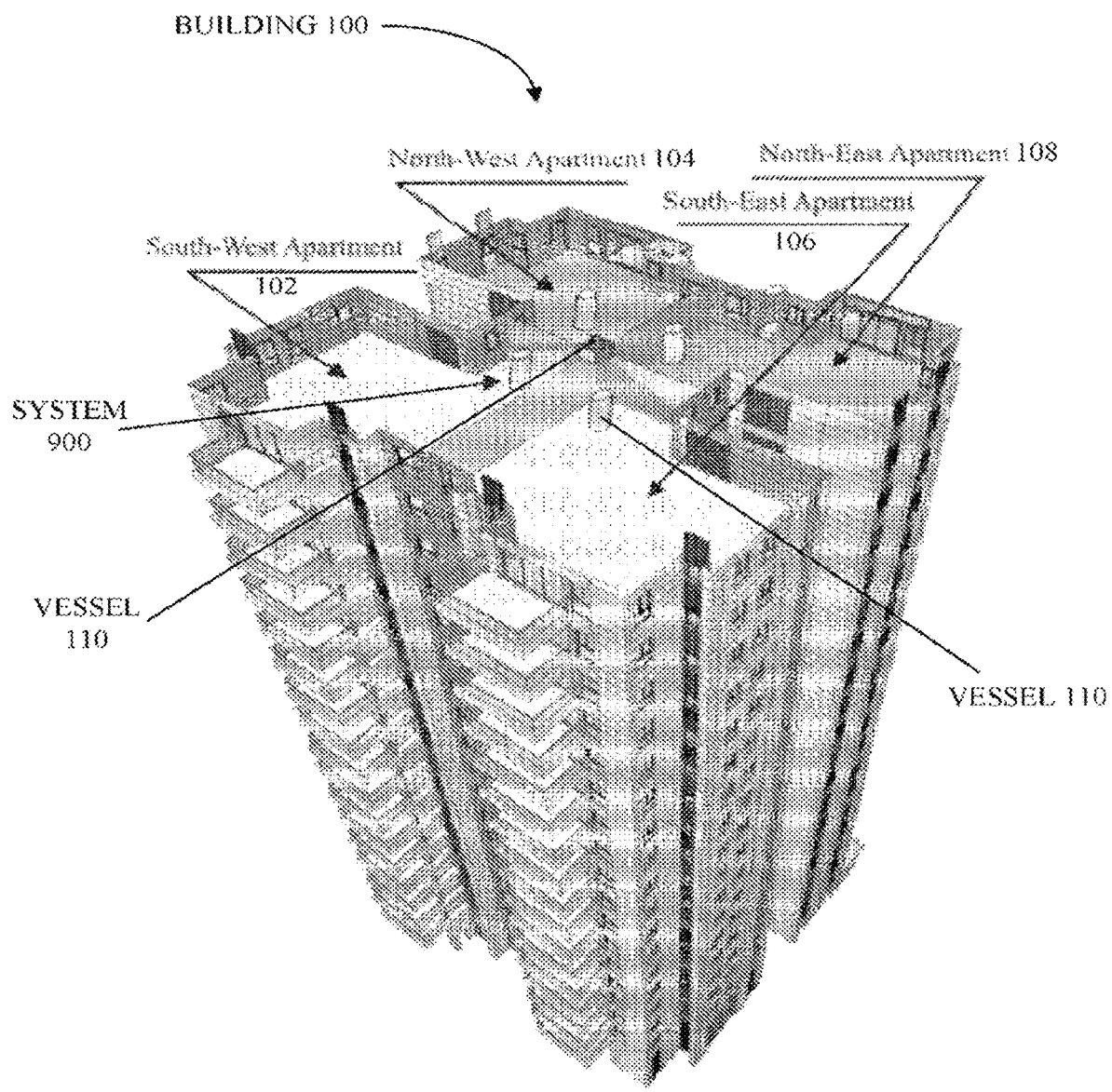
FIG. 1A illustrates a building with solar panels of the related art.

In multi-story buildings, the roof area per apartment diminishes proportionally as the number of floors increase. In addition, the distance between any solar collectors and any storage hot water vessels increase proportionally as the number of floors increase in a multi-story building. These two reasons diminish the efficiency of heating water by solar energy in multi-story buildings that use solar water heating systems having solar collectors positioned on the roof of the building.

In multi-story buildings, however, the surface area of the external walls exposed to solar radiation remains constant for each particular floor. As a result, the amount of solar radiation for heating the building increases proportionally as the number of floors increase. For example, in many parts of the world, walls facing or partially facing the sun (i.e. all walls except North facing walls in the Northern Hemisphere and South facing walls in the Southern Hemisphere) receive sufficient sunlight for residential water heating throughout most of the year.

One aspect of the present disclosure provides a system that overcomes the limitations of current technologies by enabling an independent supply of solar heated hot water to each floor in a multi-story building. This is achieved by a special design of mini central systems that collect the solar energy arriving to the external walls of each floor of any multi stores residential towers building, and store it in each particular hot water storage vessel, fitted in each apartment. This may be achieved by a special design of mini-central systems that collect the solar energy arriving to the external walls of each floor of any multi-story building (e.g., residential towers). This solar energy may be stored by fitting each particular apartment with its own hot water storage vessel. This configuration provides an even sharing between apartments of the solar energy incident on the external walls (e.g., East, South and West walls) of a typical floor for supplying abundant hot water solar heating to all the apartments in each respective floor.

Accordingly, aspects of the present disclosure take advantage of an increase of the surface area of the external walls that are exposed to solar radiation in multi-story buildings. A system for solar water heating in a multi-story building in accordance with an aspect of the present disclosure includes solar collectors installed in solar-facing (e.g. vertical) walls of the multi-story building, in which water receives thermal energy from the solar collectors. The system also includes a plurality of water vessels. The system also includes a circulating pump coupled to the plurality of solar collectors to circulate the water between the solar collectors and the plurality of water vessels on a floor of the multi-story building to enable an independent supply of solar heated hot water to each floor in, for example, a high rise building. For example, an aspect of the present disclosure provides residents of any particular floor in a multi-story building with an individual solar heated hot water system. This system can be integrated into any particular architecture with solar exposed external walls and with minimal interference to the appearance of the building.

Because a multi-story building has a modular stacking of typical floors, aspects of the present disclosure may provide these types of buildings with a practical solution for abundant hot water heated by solar energy. For example, Empirical data shows that typical hot water storage vessels achieve specified temperature after two to five hours of solar exposure, depending upon the hot water usage during the previous day and the season of the year. In addition, the twelve to fifteen hours of daylight gives the system a potential for electric production by using excess hot water supply. This electric production may substantially reduce the energy consumption of the building.

FIG. 1A illustrates a perspective view of a multi-story building 100 having multiple apartments on each floor in accordance with an aspect of the present disclosure. In FIG. 1A the building is shown with the roof and ceiling of an uppermost floor of the building removed. The building 100 has multiple stories or floors, and on each floor, may have several rooms or apartments. In the embodiment shown in FIG. 1A, each floor of the building 100 has four apartments, although other embodiments may include a larger or smaller number of apartments or rooms.

The building 100 may be oriented in any direction. In FIG. 1A, the building includes a southwest apartment 102, a northwest apartment 104, a southeast apartment 106 and a northeast apartment 108. In each of the apartments 102-108, a hot water storage vessel 110 is located for the storage of hot water. A system 900 (shown in more detail in FIGS. 9-10) is coupled to each of the hot water storage vessels 110 on the floor. The system 900 circulates a heating fluid, which may be water, oil, or other fluid or material that is capable of transferring thermal energy from the system 900 to one of the hot water storage vessels 110.

Figure 1B:
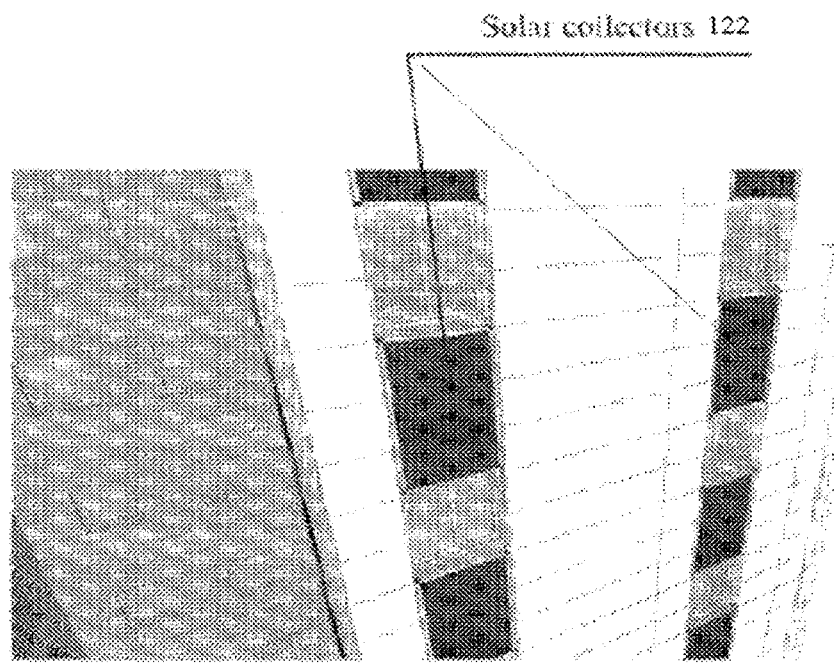
FIG. 1B illustrates a close up view of the solar collectors for a northeast apartment in accordance with an aspect of the present disclosure.
Figure 1C:
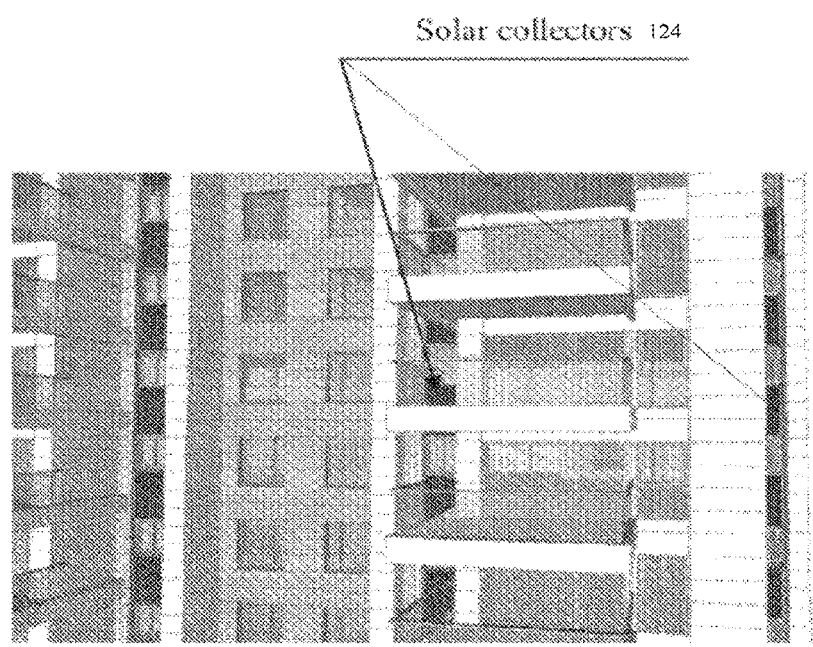
FIG. 1C illustrates a close up view of the solar collectors for a southeast apartment in accordance with an aspect of the present disclosure.
Figure 1D:
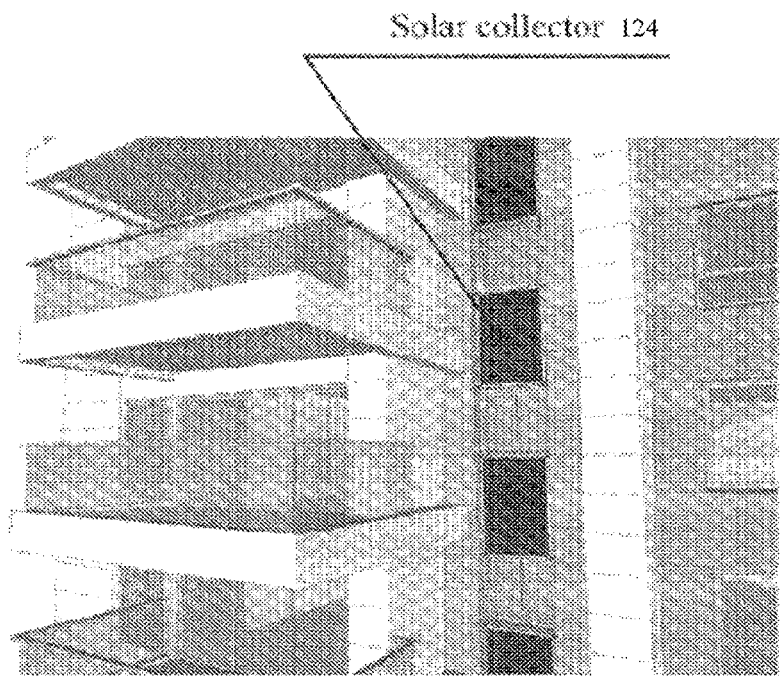
FIGS. 1D and 1E illustrate a close up view of the solar collectors for a southwest apartment in accordance with an aspect of the present disclosure.
Figure 1E:
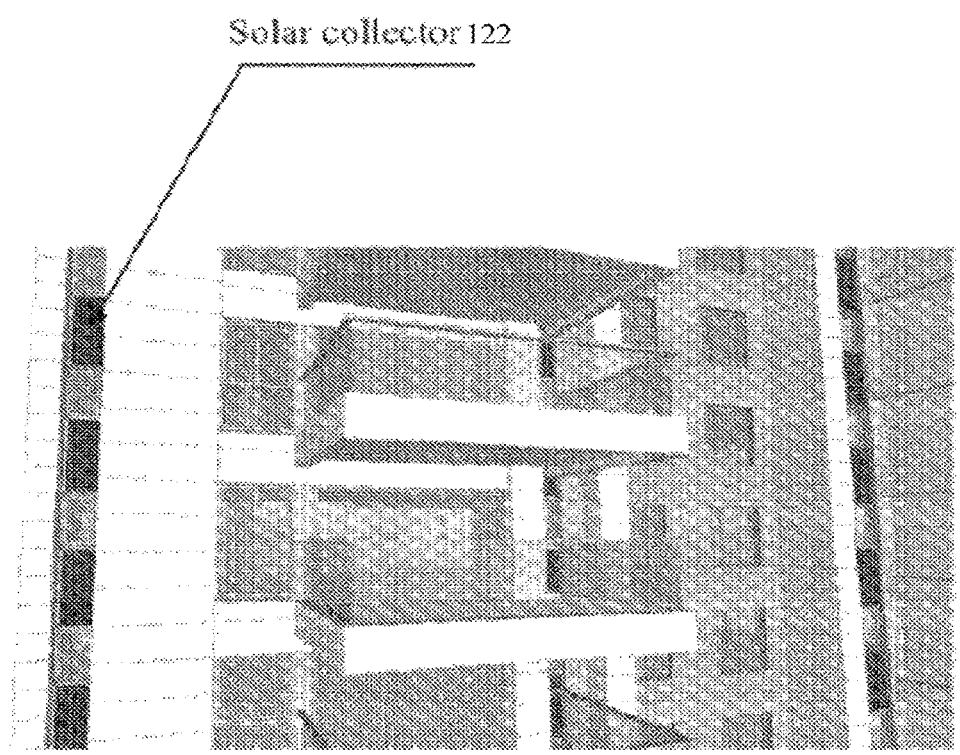
Figure 1F:
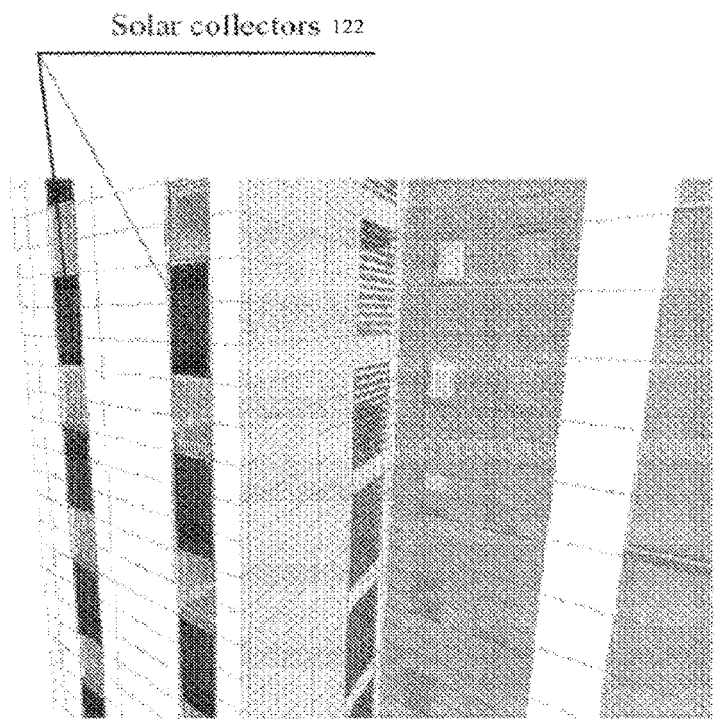
FIG. 1F illustrates a close up view of the solar collectors for a northwest apartment in accordance with an aspect of the present disclosure.

FIG. 1B illustrates a close up view of a pair of solar collectors 122 for the northeast apartment 108 in accordance with an aspect of the present disclosure. The northeast apartment(s) 108 may provide solar energy to the system 900 for a certain amount of time, depending on the geographical location of the building 100. For example, and not by way of limitation, the northeast apartment 108 on a given floor of the building 100 may provide energy to the system 900 from sun rise to approximately 10:00 AM. Other ones of the solar collectors may not be receiving solar energy and thus cannot provide energy to the system 900 during this period of time.

Figure 1G:
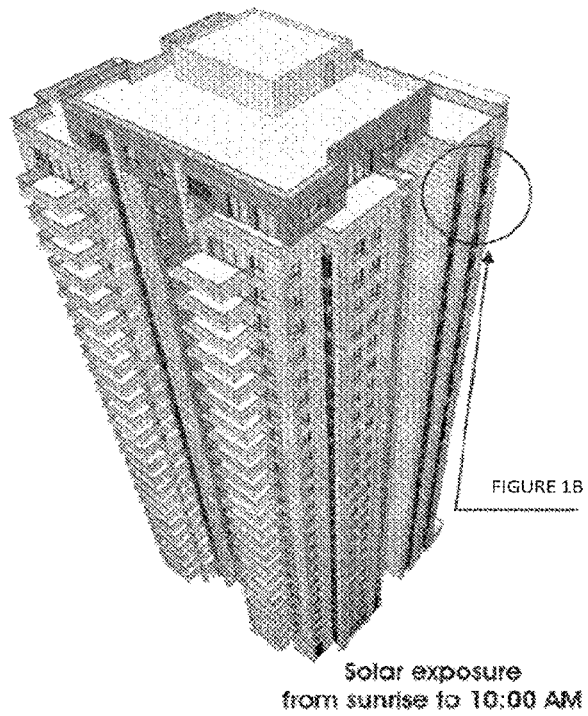
FIG. 1G illustrates an expanded view of the solar collectors of FIG. 1B in accordance with an aspect of the present disclosure.

FIGS. 1C to 1F illustrate close up views of the solar collectors, including solar collectors 124 for the southeast apartment 106 (FIG. 1C), solar collectors 124 and 122 for the southwest apartment 102 (FIGS. 1D) and 1E), and solar collectors 122 for the northwest apartment 104 (FIG. 1F) in accordance with aspects of the present disclosure. As with the northeast apartment(s) 108 shown in FIG. 1B, the solar collectors 122 and/or 124 of the apartments (e.g., 102-106) may provide solar energy to the system 900 for a certain amount of time, depending on the geographical location of the building 100. For example, and not by way of limitation, the solar collectors 124 may provide energy to the system from 10:00 AM to approximately 2:00 PM. The times that the solar collectors 122 and 124 may overlap each other, or may not overlap, based on the orientation of the building 100 and/or the overall design of the system 900. Other ones of the solar collectors 122 and/or 124 may not be receiving solar energy and thus cannot provide energy to the system 900 during this period of time. FIG. 1G is a perspective view of the building 100 including the roof area and showing the solar collectors 122 of the northeast apartment 108 in FIG. 1B.

For the apartments 102-108 that receive solar energy during some portion of the day, these apartments are fitted with solar collectors 122 and/or 124 in an external wall associated with the particular apartment. As long as the solar collectors 122 and/or 124 receive solar radiation for some appreciable time during the day, these solar collectors may provide energy to the system 900.

Figure 9:
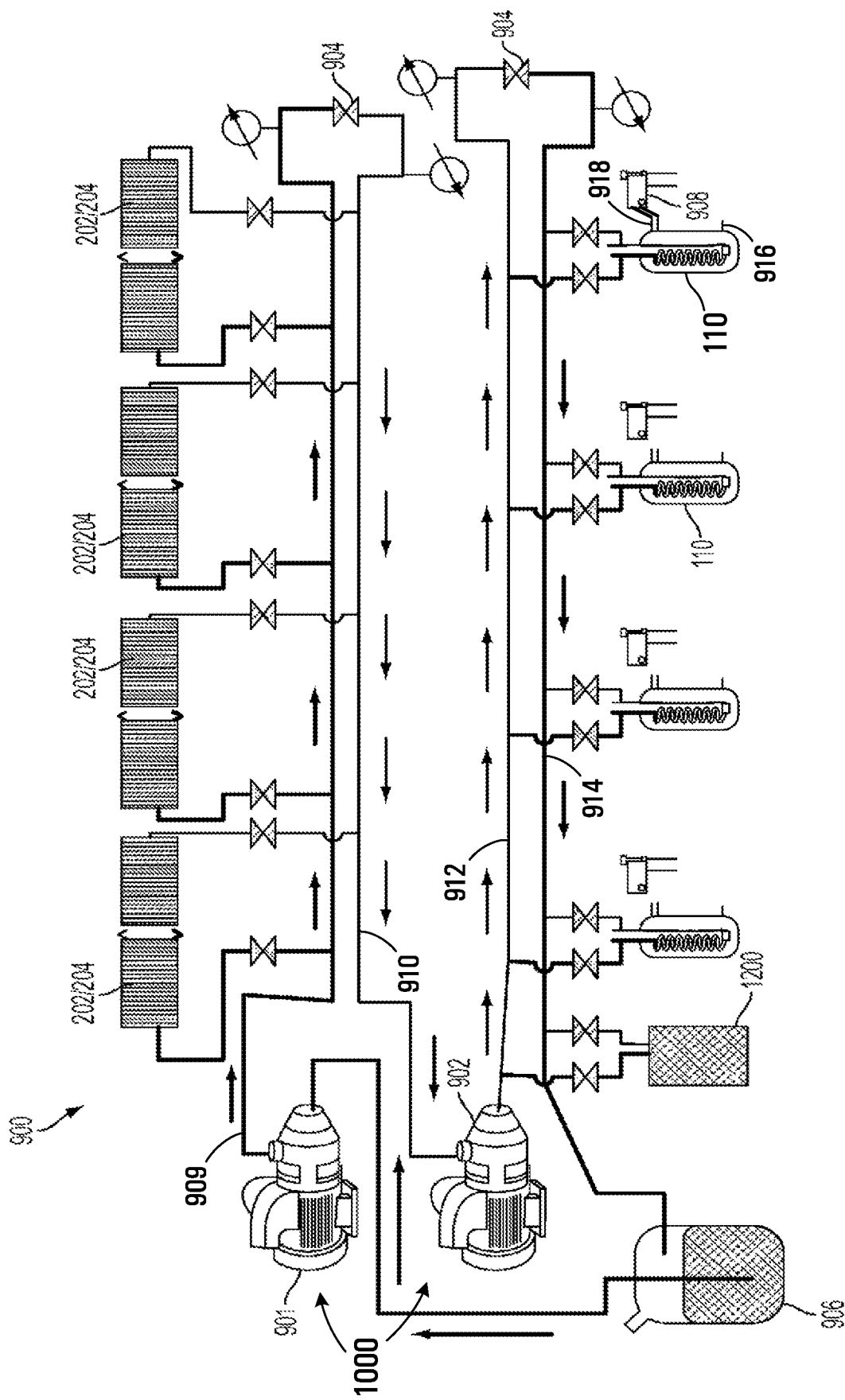
FIG. 9 illustrate a system view of a central solar water heating system for a multi-story building in accordance with an aspect of the disclosure.
Figure 10:
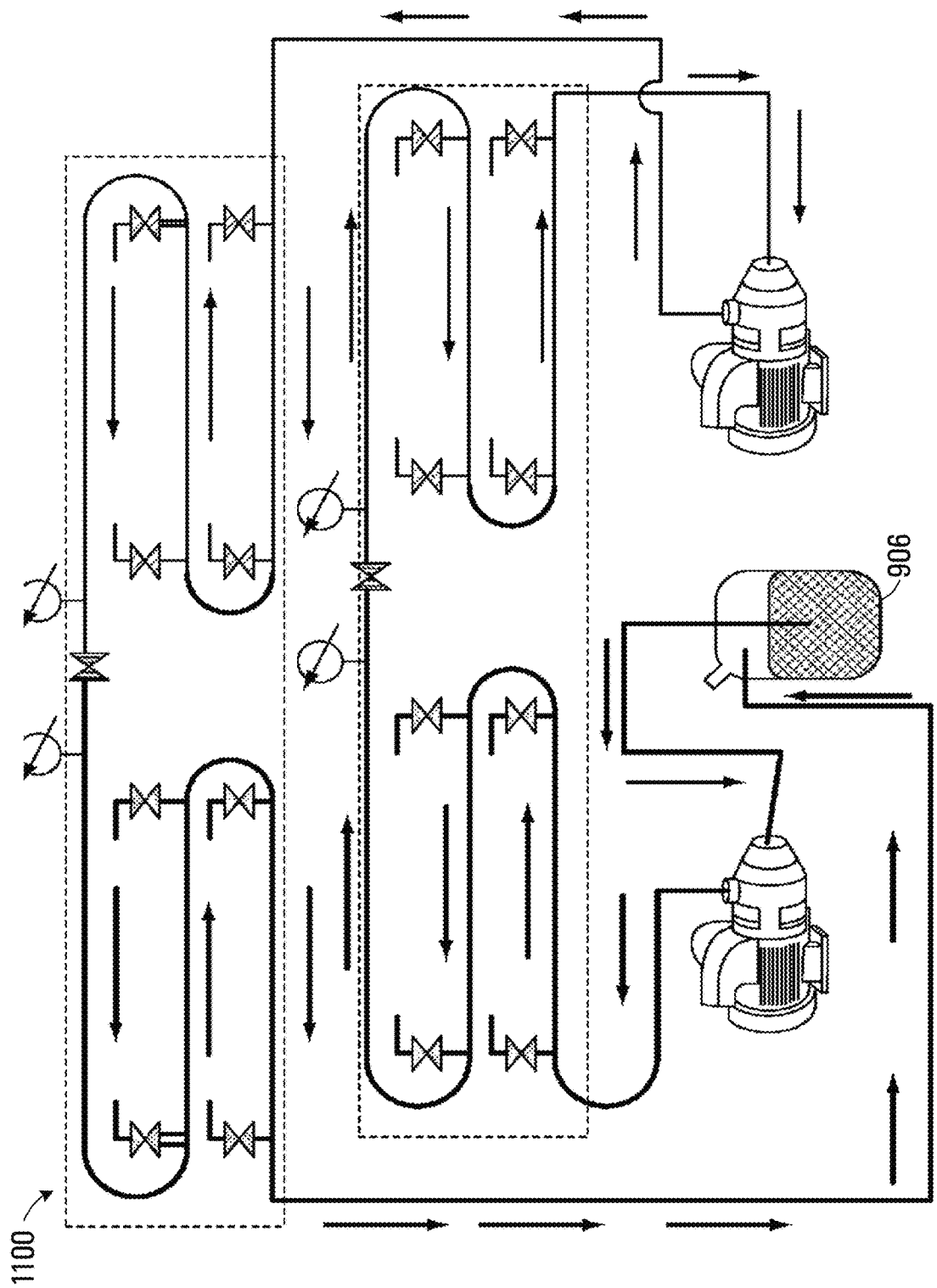
FIG. 10 illustrate a schematic description of the central solar water heating system in accordance with an aspect of the disclosure.

As disclosed above with respect to FIG. 1B, each apartment 102-108 may have a hot water storage vessel 110, which may be used as a hot water storage vessel described later herein with respect to FIG. 12. In addition each apartment may include an electric or gas backup heater to provide heating for a few days in the year when solar heating alone is insufficient for the heating requirements of the apartment. At each floor of the building 100, a fluid circulating system as shown in FIGS. 9 to 10 below may be provided.

In an aspect of the present disclosure, one or more smaller central systems collect the solar energy arriving to the external walls of each floor of any multi-story building, and store it in hot water storage vessels located around the building. The hot water storage vessels may be in each apartment, similar to individual hot water heaters, or may be shared between various rooms or floors as desired.

Figure 2:
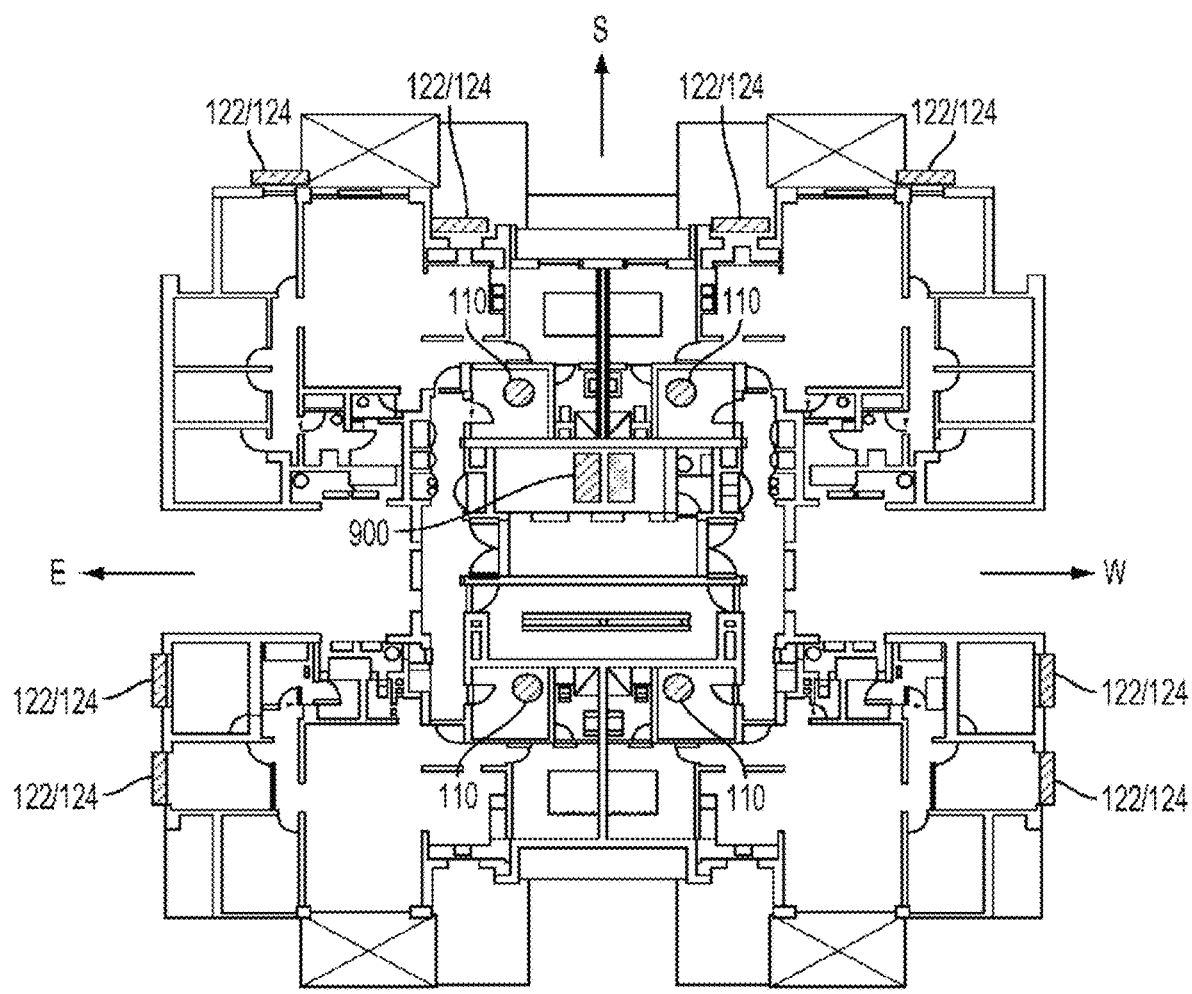
FIG. 2 is a layout of a floor of a multi-story building in accordance with an aspect of the present disclosure.

FIG. 2 illustrates a plan layout of one floor of a multi-story building in accordance with one aspect of the present disclosure. As shown in FIG. 2, the solar collectors 122 and/or 124 are positioned around the outside walls of the building 100, while the hot water storage vessels 110 and the system 900 are located inside the building 100. The hot water storage vessels 110 are shown as installed within each of the apartments (e.g., 102-108). As shown in FIG. 2, the solar collectors 122 and/or 124 may be positioned differently than the positions shown in FIGS. 1B-1F.

In FIG. 2, the walls of building 100 that will receive solar radiation may have solar collectors 122 and/or 124 installed between the windows on each of the floors. For ease of illustration, only the floor is shown as having the solar collectors 122 and/or 124 installed; it is envisioned as within the scope of the present disclosure that any or all floors of the building 100 may have similar solar collectors to the solar collectors 122 and/or 124 installed.

FIG. 2 also illustrates that there may be the same number of solar collectors 122 and/or 124 installed in any given one of the apartments. For example, and not by way of limitation, a particular apartment may have more solar collectors 122, or a collection of solar collectors 122 and/or 124, installed in that particular apartment, since the particular apartment may receive more solar radiation for conversion to thermal and/or electrical energy than other apartments in the building 100. This may be because the particular apartment faces in a direction where there are no shadows from other buildings blocking direct solar radiation from the apartment, or for other reasons. Further, any given one of the apartments may have one or more solar collectors 122 and one or more solar collectors 124 installed, depending on the wall space available in that apartment.

Apartments that receive less solar radiation may have fewer of the solar collectors 122 and/or 124 installed as these apartments may not have enough incident solar radiation to warrant the installation of solar collectors 122 and/or 124 to fill the space available for the solar collectors. Further, some apartments, such as those facing in directions that do not receive any directly incident solar radiation may not have any solar collectors 122 and/or 124 installed.

In an aspect of the present disclosure, solar collectors associated with those apartments that receive more incident solar radiation may be connected to solar collectors associated with other apartments that do not receive sufficient solar radiation such that the solar radiation between the apartments is shared for electrical generation and thermal transmission. Apartments may share the thermal and electrical generation capabilities with other apartments through coupling of the thermal receiving material (e.g., water, oil, or other fluid or material) and may also share the electrical generation properties of the larger ones of the solar collectors 122 (e.g., through transmission of electrical power from one apartment to another apartment).

In one embodiment the system 900 may include one hot water storage vessel per apartment and may be a modular central system that can be fitted in any combination of number of apartments per floor. For example, the modular units may be intended to service a certain number of apartments on a floor of the multi-story building. If there are more apartments on a floor, additional modules would need to be deployed. Table 1 provides a guideline for the number of modules per floor, assuming a minimum of four apartments. When the number of apartments involves more than one module, an additional circulating system may be supplied to circulate the heating fluid between modules to share the heat energy evenly between all the hot water storage vessels fitted in each apartment of a particular floor.

TABLE 1

| Number of apartments per floor | Number of modules |
|---|---|
| 4 | 1 |
| 6 | 2 |
| 8 | 2 |
| 10 | 3 |
| 12 | 3 |

Figure 3:
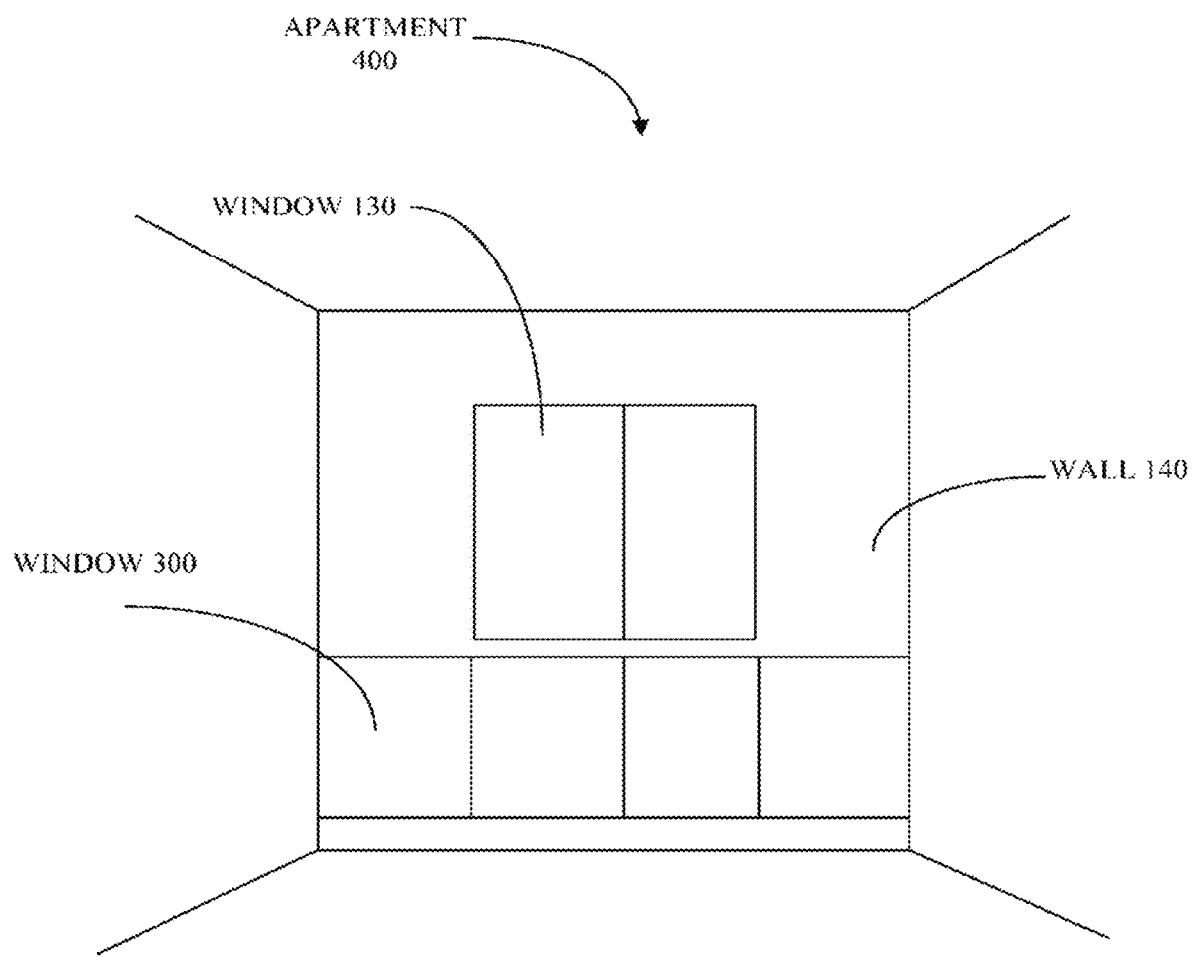
FIG. 3 illustrates an interior view of an apartment in accordance with the related art.
Figure 4:
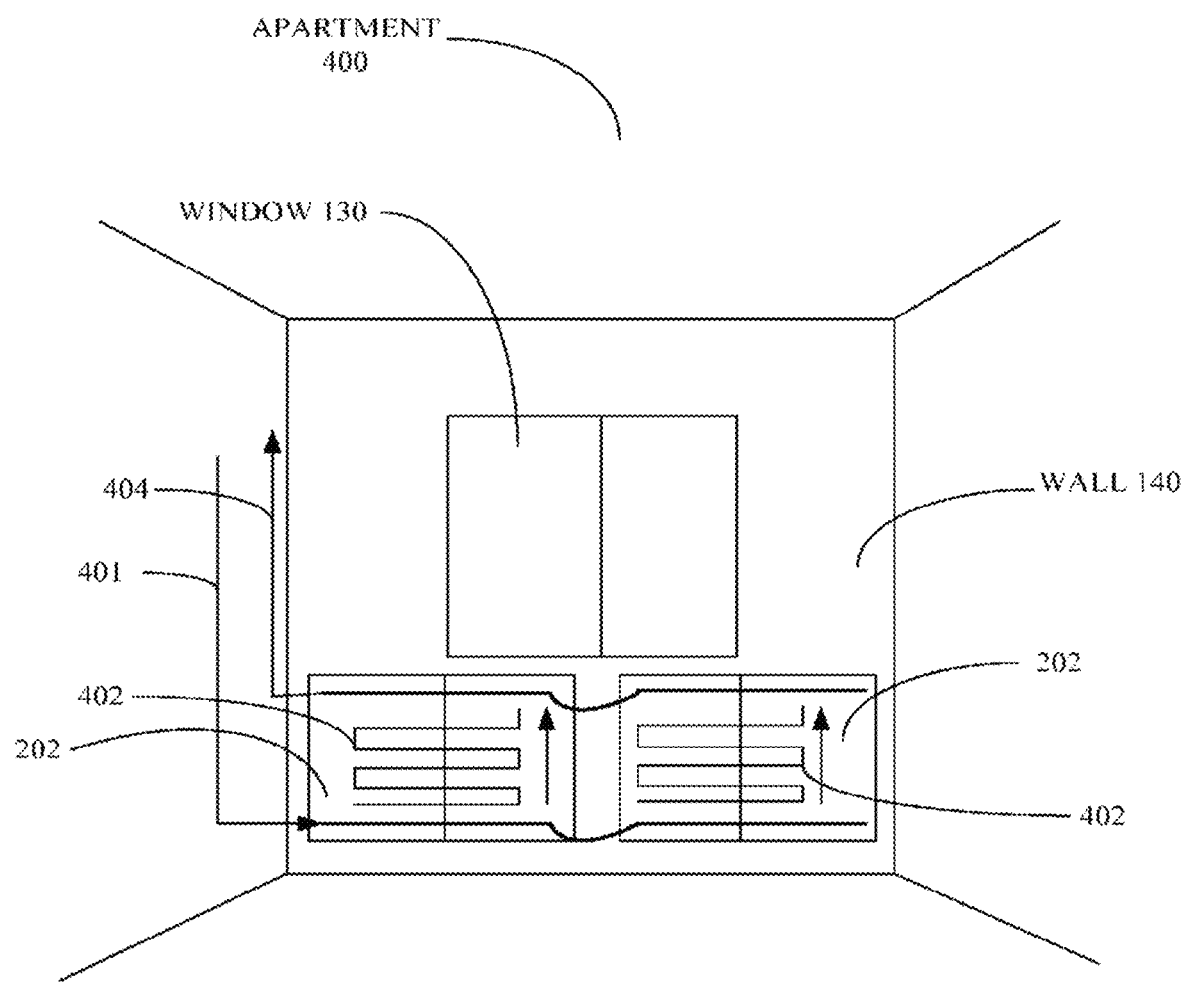
FIG. 4 illustrates an interior view of a room with a first type of solar collector in accordance with an aspect of the present disclosure.
Figure 5:
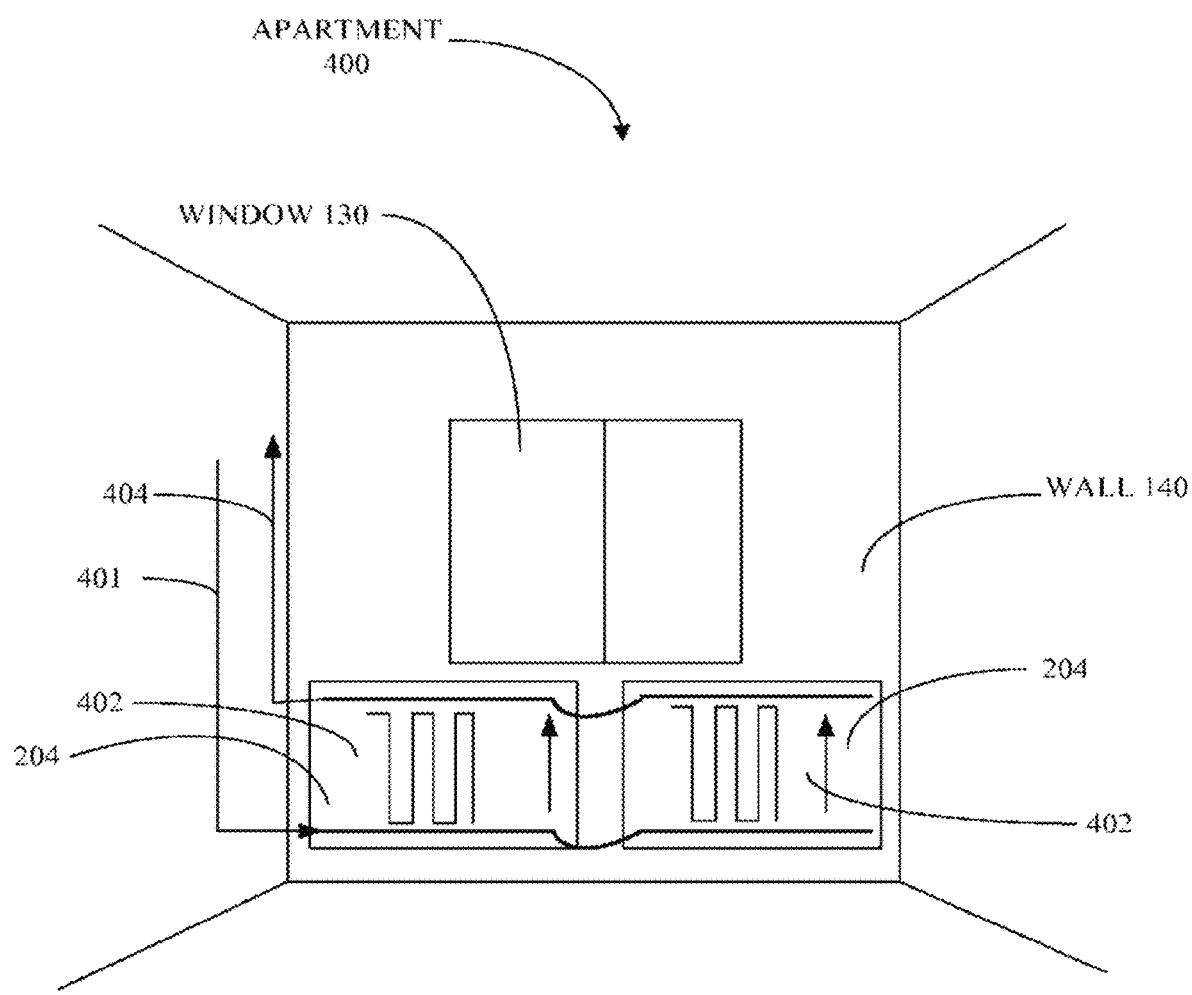
FIG. 5 illustrates an interior view of a room with a first type of solar collector in accordance with an aspect of the present disclosure.

FIG. 3 illustrates an interior view of a prior art apartment 400 from the inside of the apartment in which the windows 130 and the optional windows 300 are present in a wall 140. The optional windows 300 may be present in the wall 140 between one of the windows 130 and a floor of the apartment 400. FIGS. 4 and 5 illustrate an interior view of an apartment 400 in accordance with an aspect of the present disclosure. In FIG. 4, solar collector(s) 202 are present between the windows 130 and a floor of the apartment 400 on the wall 140. Each of the solar collectors 202 is supplied with water from line 401, and as the water from line 401 passes through radiative elements 402, the temperature of the water increases due to the apartment 400 receiving solar radiation. As shown in FIG. 4, the radiative elements 402 may be in a horizontal direction. As the water from line 401, which may be room temperature water or water that is of a lower temperature, passes through radiative elements 402, the water increases in temperature, and is discharged from the solar collectors 202 through line 404, which may be a hot or increased water temperature line. Arrows on the line 401 and line 404 indicate a direction of water flow through the solar collector(s) 202.

FIG. 5 illustrates solar collectors 204, which may have vertically oriented radiative elements 402. Other orientations of radiative elements are also possible within the scope of the present disclosure. In one configuration, a central solar water heating system is composed of two internal components of a first type (e.g. FIG. 4) or a second type (e.g. FIG. 5) of solar water heather positioned behind a specially designed fixed pane windows (e.g., with dimension of: a 3 meter width, a 1.2 meter height and positioned at 0.07 meters above the floor in some of the external walls facing: East, South and West), as shown in FIGS. 4 and 5. This setup may be provided for each apartment on a particular floor of the building 100.

Figure 6:
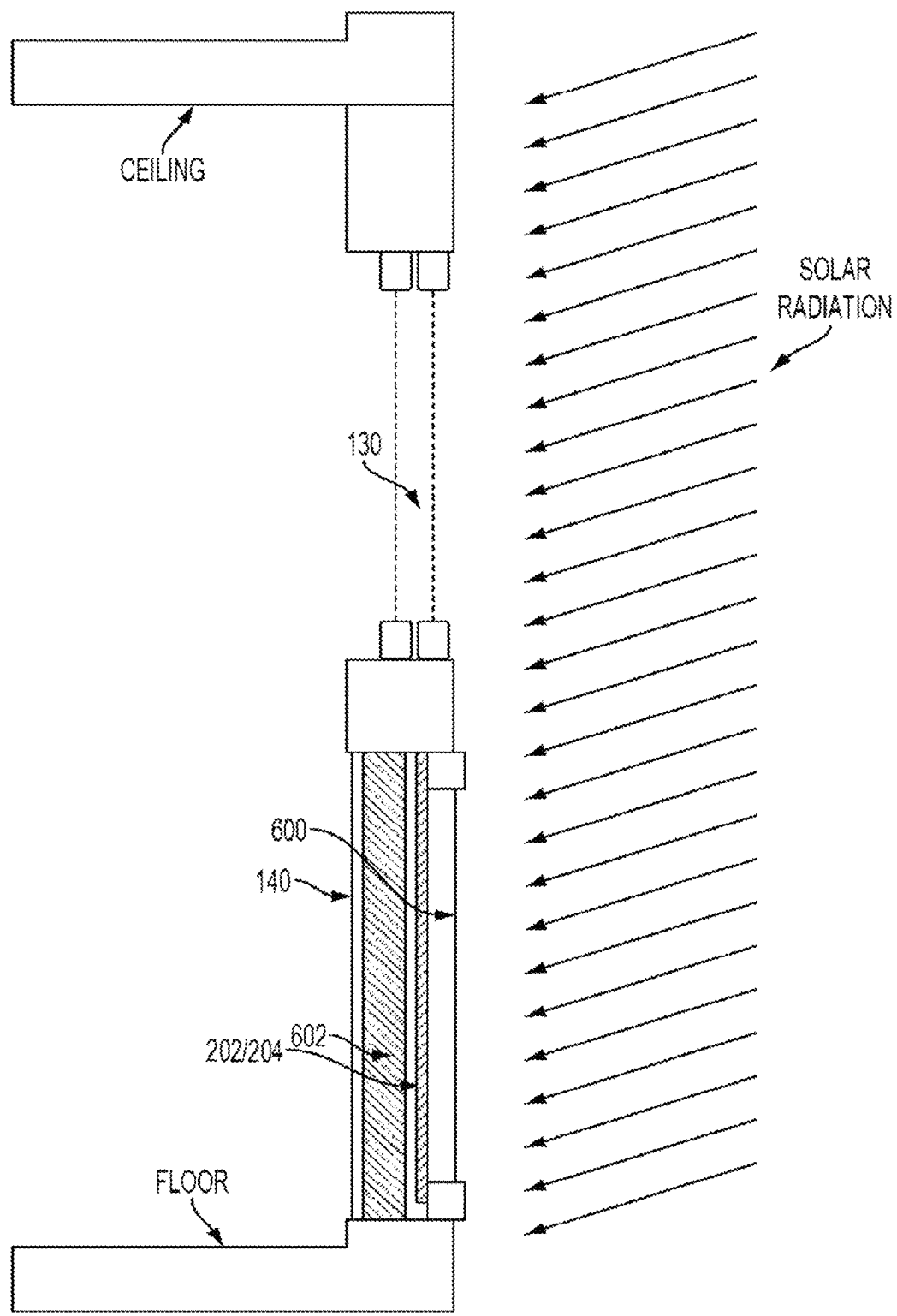
FIG. 6 illustrates a cutaway view of a wall in accordance with an aspect of the present disclosure.

FIG. 6 illustrates a cross-sectional view of an apartment exterior wall in accordance with an aspect of the present disclosure. One of the windows 130 is shown in the wall 140 with the solar collector 202/204 also in wall 140. The outside of the wall 140, as part of solar collector 202/204, may be glass 600 or other transmissive material, to allow incident solar radiation to heat the water that is passing through the solar collector 202/204. Insulation 602 between the wall 140 and the solar collector 202/204 prevents thermal losses from the solar collector 202/204, and also maintains a desired temperature at the wall 140 within the apartment.

FIG. 7 illustrates detailed views of the solar collectors 202 in accordance with an aspect of the present disclosure. A "hot" tube collector 700, as part of the solar collectors 202 collects heated heating fluid (e.g. water) from one of the solar collectors 202 and passes the heated water to the line 404. The radiative elements 402 are coupled to a heat absorbing plate 702 (FIGS. 7A, 7B) such that incident solar radiation may be thermally transferred to the radiative elements 402, and thus the water in the radiative elements 402. A "cold" tube collector 704 is coupled to the line 401, where colder water enters the solar collectors 202.

FIG. 8 illustrates detailed views of one of the solar collectors 204 in accordance with an aspect of the present disclosure. A "hot" tube collector 800, as part of one of the solar collectors 204, collects the heated water in one of the solar collectors 204 and passes the heated water to line 404. The radiative elements 402 are coupled to a heat absorbing plate 802 such that incident radiation may be thermally transferred to the radiative elements 402, and thus the water in the radiative elements 402. The "cold" tube collector 804 is coupled to the line 401, where colder water enters one of the solar collectors 204.

In an aspect of the present disclosure, as shown in FIGS. 4-7, the system includes the solar collectors 202/204 used as heating devices for water. The solar collectors 202/204 may be positioned behind a fixed pane window on the solar-facing walls of the building 200. These walls may be located between the floor and the windows 130 of each room/apartment on a given floor of the building 200.

Aspects of the present disclosure also provide sharing of the solar energy arriving to the external walls, e.g., east, south and west walls in a Northern Hemisphere building on a building level (also referred to as a building floor) to produce hot water solar heating to all the rooms (e.g., apartments) on that floor or level.

Referring again to FIG. 2, since hot water storage vessels may achieve a desired water temperature in about 2 to 5 hours, depending upon the hot water utilization and the season of the year, if an average amount of sunlight available to a system in accordance with aspects of the present disclosure is greater than 2 to 5 hours (e.g., 12 to 15 hours of sunlight per day), this provides the system with the potential for both solar water heating and, possibly, electricity production. As shown in FIG. 2, the hot water storage vessels 110, which may be used to store hot water, may be positioned in several ones of the rooms on a given floor of a building, and the hot water storage vessels may be connected to each other via a common connector. The common connector may sense the temperature of the water in each of the hot water storage vessels 110, and/or may circulate the water between the hot water storage vessels 110, or transfer water from one of the hot water storage vessels 110 to another based on usage within the rooms. Further, the common connector may also have one of the hot water storage vessels 110 included, which may act as an additional hot water reservoir or may act as an overflow device for the hot water storage vessels 110. The common connector may be in a common area of the floor as desired.

The connections between the common connector and the hot water storage vessels 110 may shorten the distance between the solar collectors 122/124 and the hot water storage vessels 110, and also conceals these elements from the residents and facilitates maintenance. It also may result in cost reduction. The common connector provides sharing of the solar energy arriving to the external east, south and west walls of a typical floor to produce hot water solar heating to all the rooms in this floor and protects the solar collectors from freezing at night in the cold seasons, by supplying them small amount of heat from the storage vessels and/or from the common connector.

FIG. 9 illustrates components of the system 900 in accordance with an aspect of the present disclosure. As shown in FIG. 9, the solar collectors 202/204 are provided in a closed-loop system. A pump 901 pumps the heating fluid via a high pressure line 909 to each of the solar collectors 202/204 where the heating fluid is heated by solar radiation and returned to a lower pressure line 910. In this embodiment a pump 902 pumps the heated fluid (e.g. hot water) through the hot water storage vessels 110 via a line 912. Pressure regulating valves 904 control the pressure in the system 900 and a secondary vessel 906 is coupled to the pump 901 and provides a reservoir of heating fluid for the pump 901 to draw from. Heating fluid is returned from the hot water storage vessels 110 via a line 914 to the secondary vessel 906. The hot water storage vessels 110 each include a cold water inlet 916 and a hot water outlet 918. An on the flow electric heater 908 may be coupled to the hot water outlet 918 of the hot water storage vessels 110 to provide additional heating of the water if required. An anti-overheating device 1200 is coupled to the pump 902 between the lines 912 and 914 to prevent overheating of the water in the hot water storage vessels 110 as described later herein.

In the embodiment shown in FIG. 9 the system is composed of three sub-systems: solar collectors units 202/204, hot water storage vessels 110, and a fluid circulating system 1000. This unique setup provides an efficient solution for shortening the distance between the solar collectors 202/204 and the hot water storage vessels 110, and also conceals these elements from the residents, while facilitating maintenance with reduced setup cost. This arrangement provides an even sharing of the solar energy arriving to the external: East, South and West walls of a typical floor to produce abundant hot water solar heating to all the apartments on a particular floor. In addition, this arrangement protects the solar collectors from freezing at night in the cold seasons, by supplying them with a small amount of heat from the storage vessels.

The system shown in FIG. 9 may be used to share energy in accordance within an aspect of the present disclosure. The water inlet 916 provides water from a mains supply or from another source, such as a well. As water enters one of the hot water storage vessels 110, it is stored until heated to a specific desired temperature. Hot water may be supplied to the apartment via the flow heater 918, which may additionally heat the water. In a closed system, other heating fluid, which may be water or other heat-transferring material, is pumped through the line 912 to the hot water storage vessels 110 by the pump 902. A pump 901 also pumps the heating fluid through the line 909 to the solar collectors 201/204 and then through the line 910 and the pump 901 to one of the hot water storage vessels 110. As this flow of heating fluid (e.g. water) heats up, the heat in each of the hot water storage vessels 110 may be transferred between a heat transfer coil and the water from the water inlet 916. In an alternative "open" system embodiment, the water from the water inlet may also be pumped through the solar collectors 202/204 and only released from one of the hot water storage vessels 110 once a certain temperature is reached. The pumps 901 and 902 may be located in a common area, or may be located near one of the hot water storage vessels 110, as desired.

FIG. 10 further illustrates the compact design of a system 1100. It is estimated that the system 1100 can be arranged in a cabinet having a volume less than a cubic meter. In an aspect of the present disclosure, the system 1100 can be assembled in a cabinet prior to installation in the building 100 and be fully tested and full of heating fluid. At the time of installation, instead of solar collectors 202/204 and the hot water storage vessels 110 being installed, tube jumpers may be connected to test the system 1100. When installed in a building 100, the system 1100 may be connected to solar collectors 202/204 and the hot water storage vessels 110 while the power to the system 1100 remains off. Heating fluid may then be added to the secondary vessel 906 to fill the system 1100 once all of the solar collectors 202/204 and/or the hot water storage vessels 110 are installed.

The potential size of the solar collection area may be larger than that required for solar water heating. If additional collectors are available, or the usage of hot water is not as much for a given day, the additional collectors may produce electricity by the Organic Rankin Cycle (ORC) Power Turbine or/and air conditioning by the "Absorbance cooling" technique. If such a technique is not available, the additional heat may be dissipated by an anti-overheating device as shown in FIG. 11.

Figure 11:
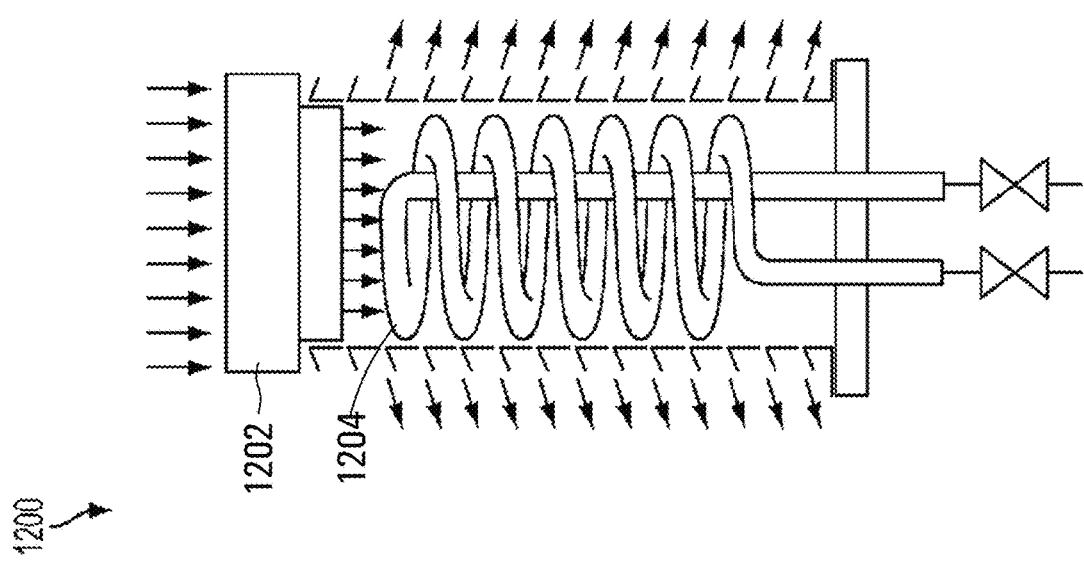
FIG. 11 illustrates an anti-overheating device in accordance with an aspect of the present disclosure.

FIG. 11 illustrates an anti-overheating device 1200 in accordance with an aspect of the present disclosure. The anti-overheating device 1200 may be similar to an automobile radiator to maintain a temperature of the water. The anti-overheating device 1200 may protect the hot water vessels (FIG. 12) from overheating. The anti-overheating device 1200 may be similar in dimension to the hot water storage vessels 110 and includes a heating coil 1204, for example, as shown in FIG. 12. In one configuration, anti-overheating device 1200 is automatically connected to the hot water manifold by two electromagnet valves when the "upper temp sensor" (see FIG. 12) reaches predetermined temperature (e.g., 55° C.). At the same time, the electric fan 1202, fitted at the top of the anti-overheating device 1200 is turned ON, and the surrounding, cool air is sucked into the anti-overheating device 1200 to cool the fluid temperature until the sensor returns to the predetermined temperature and the device is turned OFF. This setup performs as a temperature controller to keep the water temperature in all the hot water storage vessels lower than the predetermined temperature to avoid any thermal injury, particularly to children.

Figure 12:
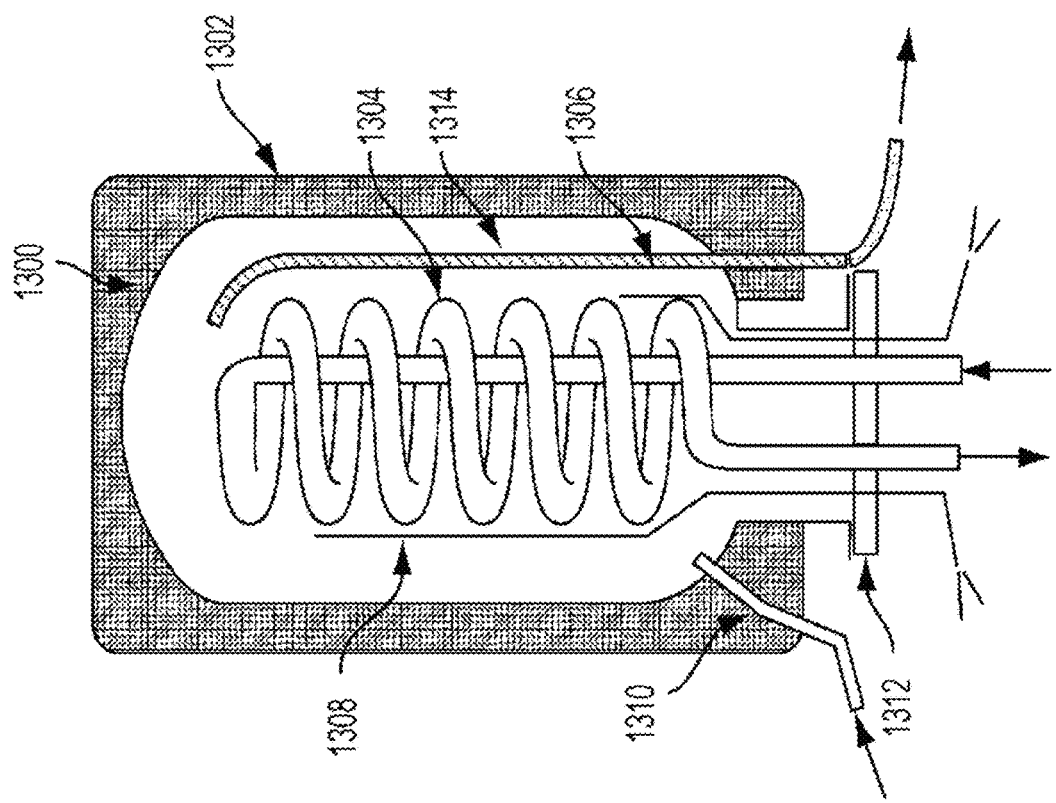
FIG. 12 illustrates a hot water storage vessel in accordance with an aspect of the disclosure.

FIG. 12 illustrates the hot water storage vessel in accordance with an aspect of the disclosure. The hot water storage vessel 1300 contains water provided via an inlet 1310 to be heated, and insulation 1302 is shown as surrounding the hot water storage vessel 1300. A coil 1304 may include a bi-metallic or other heat sensitive device that will open and close a closing flange 1312 when a lower sensor 1306 and an upper sensor 1308 sense conditions that should stop or start the flow of water through the hot water storage vessel 1300. As water enters from the cold inlet 1310, the lower sensor 1306 and the upper sensor 1308 sense the temperature of the water in the hot water storage vessel 1300. If the temperature is within range, the water is passed through the hot water storage vessel 1300 to a hot water outlet 1314. If the temperature is too hot, the coil 1304 will close the closing flange 1312 and prevent the hot water outlet 1314 from receiving any water flow. The hot water storage vessel 1300 may be protected from freezing either by an antifreeze fluid or alternatively, by the transport of heat from the collectors to the storage vessels during day time, which provides protection from freezing during sundown and night times with the continuing operation of the circulating pumps from the storage vessels to the collectors.

A microprocessor-based control system may monitor the proper operation of this closed loop fluid circulating system, using incorporated physical sensors such as: pressure, temperature and fluid flow velocity sensors. These may be located in the common connector, and may be coupled to the lower sensor 1306 and the upper sensor 1308 if desired. Further, the system may report system conditions for a given room, apartment, floor, or building may be determined by the system and reported to tenants, occupants, etc., either via displays in each room, floor, or via wireless technology, phone applications, or other means.

Additional energy created by aspects of the present disclosure may be used to operate the microprocessor, as well as the pumps or other energy-consuming devices within the system described herein.

In the closed system shown in FIGS. 9-10, the hot water storage vessels 110 and solar collectors 122/124 are interconnected by a circulating hot fluid that transfers the solar energy from the solar collector to the hot water storage vessels. Because this circulating hot fluid system is operating 24 hours a day, each inhabitant in each particular floor can use more hot water than the capacity of his personal storage vessel.

As noted above, the proposed system produces more hot water during the day than may be utilized under normal consumption. To fully utilize this hot water, one configuration may connect the hot water to both the washing machine and dishwasher so that hot water can be used as needed. For example, coupling the intake of the laundry dryer to the exhaust of the anti-overheating device shown in FIG. 11 reduces the electric consumption of this device as well.

An apparatus for solar fluid heating in a multi-story building in accordance with an aspect of the present disclosure includes means for receiving thermal energy installed in solar-facing (e.g., vertical) walls of the multi-story building, in which fluid receives a solar energy from the plurality of solar collectors. The receiving means may be the solar collectors 202/204 as shown in FIGS. 9-10. Such an apparatus also includes means for transferring the solar energy as thermal energy through a heating fluid. The transferring means may be the hot water storage vessels 110/1300 as shown in FIG. 12. The apparatus also includes means for circulating the heated fluid between the plurality of solar collectors and a plurality of fluid storage vessels on a floor of the multi-story building. The circulating means may be the pump 901 as shown in FIG. 9. In another aspect, the aforementioned means may be any module or any apparatus configured to perform the functions recited by the aforementioned means.

Figure 13:
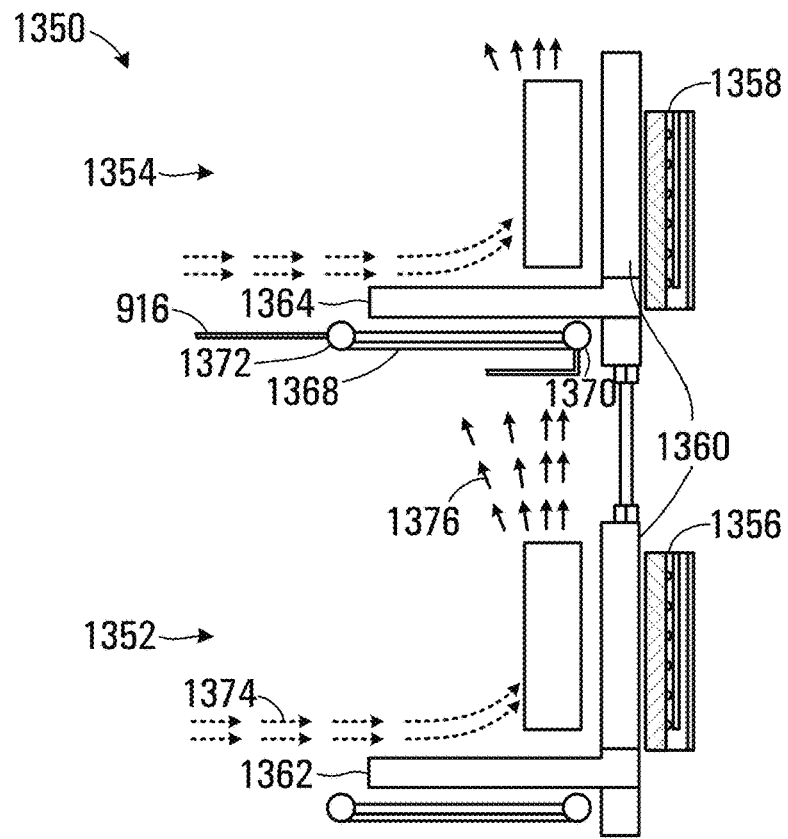
FIG. 13 is an elevational view of a plurality of apartments in a multi-story building in accordance with another disclosed embodiment.

Referring to FIG. 13, a stagnant heat recovery system is shown generally at 1350. The heat recovery system 1350 operates in cooperation with the hot water supply system 900 or 1100 shown in FIGS. 9 and 10. In FIG. 13 two floors 1352 and 1354 are shown and each depicts a portion of an apartment located on the respective floors of a multi-story building. The apartment on the floor 1352 has a floor 1362 and a ceiling 1364. The ceiling 1364 also forms the floor of the apartment on the floor 1354. In some embodiments the ceiling 1364 may be configured as a ceiling plenum that is disposed below the floor above and the ceiling 1364 may either be disposed within the ceiling plenum or below the ceiling plenum.

Each floor 1352 and 1354 has a respective solar collector 1356 and 1358, which in this embodiment are externally mounted on an outer wall 1360 of the building. Each solar collector is part of a hot water supply system, such as the system 900 shown in FIG. 9, and heats a circulating heating fluid used to heat a heating coil within a hot water heating vessel 110, as shown in FIG. 9 and FIG. 12. In the embodiment shown the solar collector 1356 is disposed on a solar facing wall associated with the floor 1352 of the building. In other embodiments the solar collector 1356 may be disposed on a solar facing wall associated with another floor or portion of the building if the floor 1352 does not have adequate outer wall walls exposed to solar radiation.

Each apartment also includes a source of stagnant heat within the floors 1352 and 1354. In this embodiment the source of stagnant heat in the apartment on the floor 1352 is shown as an electrical heating device 1366 that is configured to heat the apartment. In other embodiments other sources may generate heat and act as the source of stagnant heat. The apartment on the floor 1352 also includes a heat exchanger 1368 located proximate the ceiling 1364. The heat exchanger 1368 has an inlet 1370 for receiving a supply of cold water, for example, from a mains supply. The heat exchanger 1368 also has an outlet 1372 in fluid communication with the water inlet 916 of the hot water vessel 110 shown in FIG. 9.

In the embodiment shown, the apartment on the floor 1352 is heated by the electrical heating device 1366, which draws cool air 1374 from proximate the floor 1362 and through the electrical heating device. The electrical heating device 1366 heats the cool air to provide heated air 1376 for heating the apartment. A portion of the heated air rises toward the ceiling 1364 provides the stagnant heat source, which is collected by the heat exchanger 1368 and thermally coupled into the water flowing through the heat exchanger to pre-heat the cold water. The pre-heated cold water is supplied to the water inlet 916 of the hot water vessel 110 thus reducing the amount of heating required to provide the hot water supply for the apartment.

In one embodiment each floor 1352, 1354 of the building may include a plurality of apartments and a plurality of hot water vessels, each hot water vessel being operably configured to supply hot water to one associated apartment. As described above in connection with FIG. 9, the system may further include the fluid circulating system 1000 operable to circulate the heating fluid between the solar collectors (i.e. the plurality of solar collectors 201/204 in the embodiment shown) and respective heating coils of each of the hot water vessels 110. The heating fluid is thus operable to heat water in each one of the plurality of hot water vessels 110 for suppling hot water to the specific apartment associated with the hot water vessel. In this embodiment the heat exchanger 1368 may also be disposed within the specific apartment and connected to supply preheated cold water to the hot water vessel 110 that is associated with the apartment.

Figure 14:
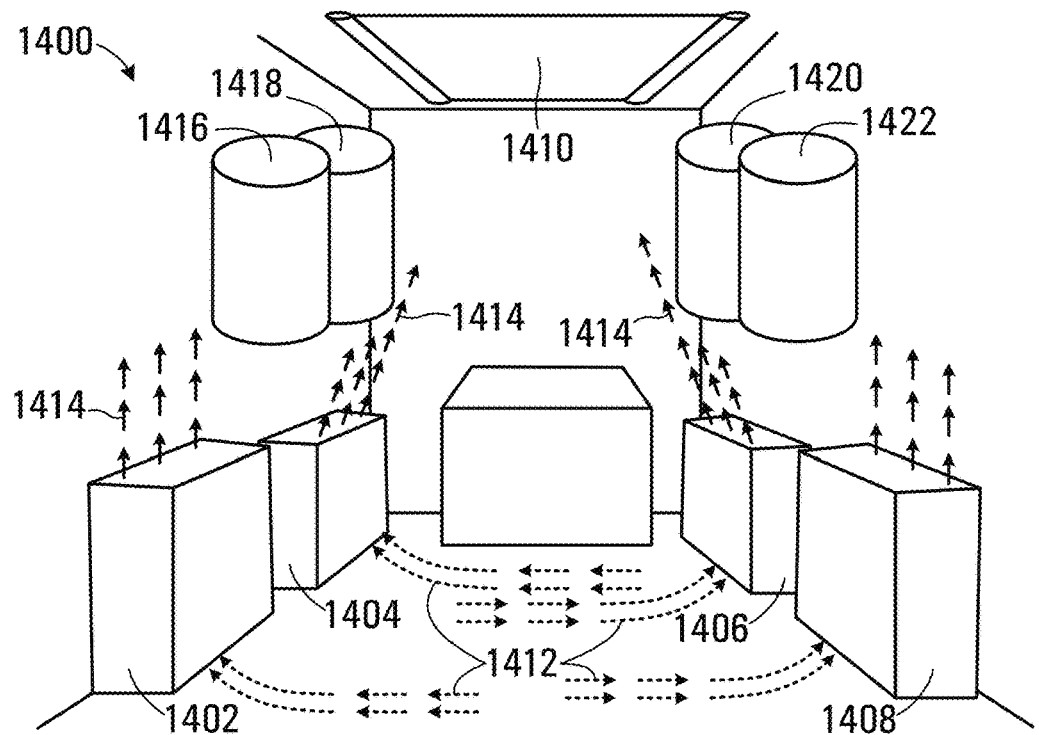
FIG. 14 is a perspective view of a common area associated with a floor of the building shown in FIG. 13.

Referring to FIG. 14, in one embodiment the floors 1552 and 1354 of the building may each include a common area 1400. In one embodiment the common area 1400 may be centrally located between the apartments on a floor of the multi-story building. The apartments may also each include a split air conditioner that has an external unit (e.g. external units 1402-1408) that are located within the common area 1400. The split air conditioner will also have an internal cooler (not shown) within each one of the apartments that corresponds to the respective external units 1402-1408. The common area 1400 also has a heat exchanger 1410 disposed within the common area. In this embodiment a single heat exchanger 1410 is shown within the common room, although additional heat exchanges could be included in other embodiments. The respective external units 1402-1408 of the split air conditioners draw in cold air 1412 and release excess heat 1414 during operation of the external unit of the split air conditioner. The excess heat 1414 moves upwardly toward the single heat exchanger 1410 and acts as a stagnant heat source for heating water to supply to the water inlet 916 of the hot water vessels 110 as described above. In this embodiment the plurality of hot water vessels may also be also disposed within the common area as shown at 1416-1422. Accordingly, in one embodiment each floor of a multi-story building may include a common area such as shown at 1400 housing the external units 1402-1408 of the split air conditioner, the heat exchanger 1410, and the plurality of hot water vessels 1416-1422, each hot water vessel being operable to supply hot water to respective apartments on the same floor of the building.

Figure 15:
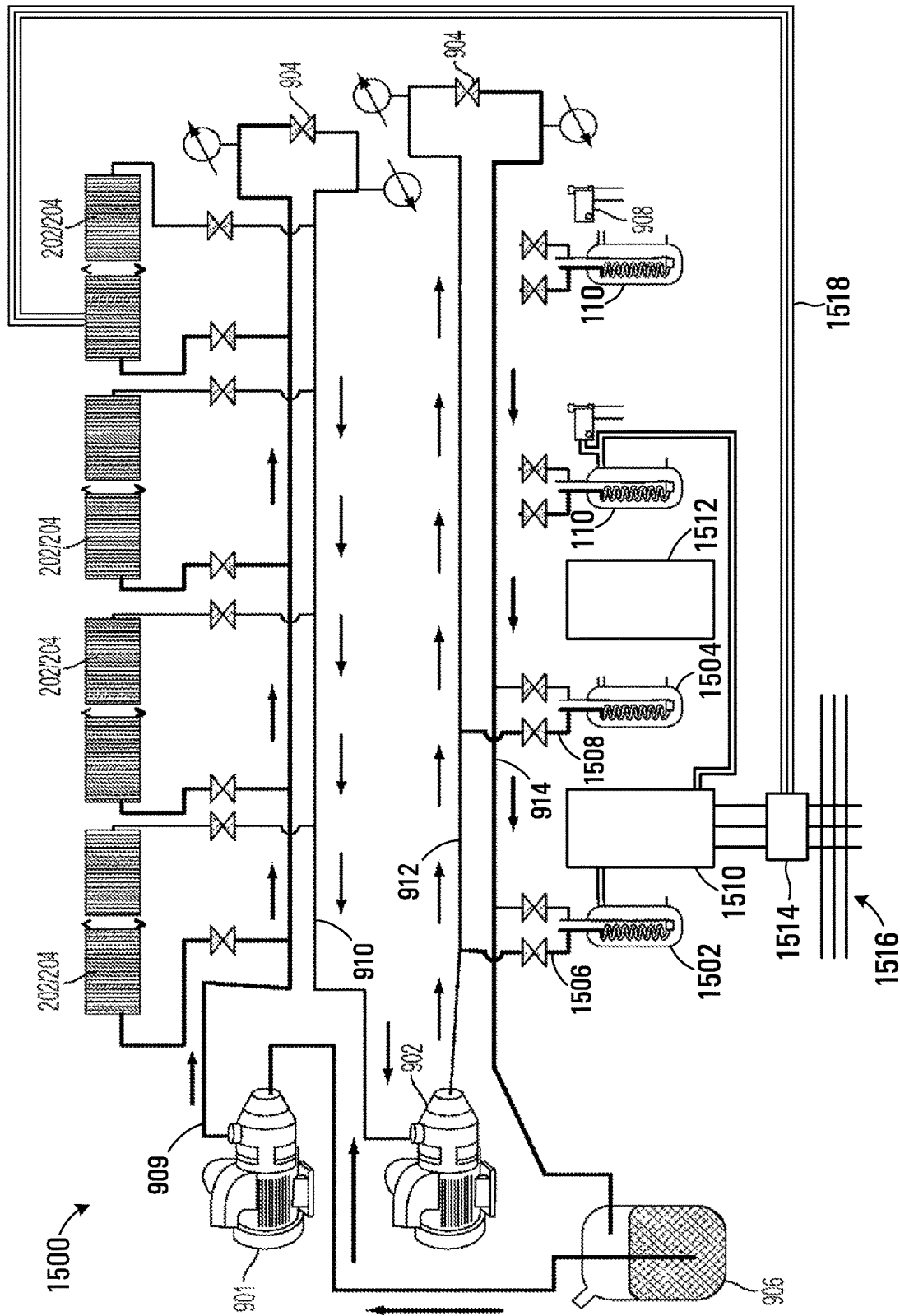
FIG. 15 is a schematic depiction of a system view of a hot water heating system and electrical energy generation system for a multi-story building in accordance with another aspect of the disclosure.

Referring to FIG. 15, an alternative embodiment of the system 900 (FIG. 9) is shown generally at 1500 and includes the pumps 901 and 902, the solar collectors 202/204, valves 904 and the secondary vessel 906. In this embodiment the system 1500 includes cold water storage vessels 1502 and 1504 and two hot water vessels 110. In FIG. 15 two hot water vessels 110 and two cold water storage vessels 1502 and 1504 are shown, but in practice the system may include a hot water storage vessel and cold water storage vessel for each apartment.

As disclosed above, the solar collectors may also be utilized to produce electricity using an Organic Rankin Cycle (ORC) Power Turbine. The cold water storage vessels 1502 are similarly configured to the hot water storage vessel 1300 shown in FIG. 12 having a coil that carries a fluid, but in this case the heating fluid is used as a cooling fluid for cooling water received at respective inlets 1506 and 1508 of the cold water storage vessels. In the system 1500, the hot water vessels 110 are also operably configured to disconnect from the lines 912 and 914 when there is insufficient solar radiation to heat water in the vessels. As disclosed above, a flow electric heater 908 may be used to additionally heat water for supplying to the apartment when there is insufficient solar radiation on the solar collectors 204/202.

The cold water storage vessels 1502 and 1504 are similarly operably configured to connect to the lines 912 and 914 when there is insufficient solar radiation on the solar collectors 202/204. The pumps 901 and 902 continue to circulate the heating fluid through the solar collectors 202/204 while the cooling coils in the cold water storage vessels 1502 transfer heat from the water within the cold water storage vessel to the cooling fluid. The solar collectors 202/204 are operable to transfer heat from the cooling fluid through radiative cooling when solar radiation is not being received at the solar collector such that circulation of the cooling fluid through the cooling coil causes cooling of the water in the cold water storage tank. Nighttime radiation cooling is dependent on atmospheric water vapor conditions such as cloud cover and is also more effective in low humidity environments but will generally cause cooling of water within the cold water storage vessels 1502.

The system 1500 additionally includes a pair of Organic Rankin Cycle (ORC) generators 1510 and 1512, each in fluid communication with one of the cold water storage vessels 1502 and one of the hot water vessels 110. The ORC generator 1510 has a working fluid and hot water supplied by the hot water vessel 110 is used to cause evaporation of the working fluid and cold water in the cold water storage tank 1502 is used to cause condensation of the working fluid for operating the generator to generate mechanical energy. ORC generators are available as an integrated compact unit for small-scale use, such as for example the Carefree® Integrated Power Module (IPM) available from Calnetix Technologies of Cerritos Calif., USA. The mechanical energy may be coupled to an electrical generator for generating electrical energy. The Calnetix IPM includes a high-speed permanent magnet electrical generator for generating electrical energy, which may be fed onto the power grid 1516 via an electrical energy distribution system and/or metering device 1514 that compensates the apartment owner for the electrical energy provided to the grid. In one embodiment the energy provided to the grid 1516 may be applied as an offset against energy otherwise consumed by the apartment off the power grid.

In another embodiment cooled water in the cold water storage vessels 1502 and 1504 may be further used to provide cooling for an air intake of an internal unit of an air conditioner. As disclosed above, the split air conditioners of which the respective external units 1402 are shown in FIG. 14 have a corresponding internal cooler (not shown) within the apartment and the cooled water in the cold water storage vessels 1502, 1504 may be used to cool an air intake for the internal coolers of the split air conditioners in each apartment.

Still referring to FIG. 15, in one embodiment the solar collectors 202/204 may be configured as hybrid solar collectors that include photovoltaic cells additional to the solar collectors described above and operably configured to generate electrical energy. Such hybrid solar panels that generate both electricity and heat for commercial and industrial applications are available from Naked Energy of West Sussex, United Kingdom. The hot water solar collectors in the hybrid panels are operable to supply hot water to one apartment in the plurality of apartments as described above. In FIG. 15, one of the panels 202/204 is configured as a hybrid panel and is connected via an electrical power line 1518 to the electrical energy distribution system 1514.

The electrical energy distribution system 1514 may be operable to distribute electrical energy generated by the solar collector to the benefit of each apartment in the plurality of apartments. As in the case of the ORC generators 1510 and 1512, the electrical energy provided may also be distributed to an electrical supply utility for an economic benefit, the economic benefit being shared between the plurality of apartments. In one embodiment, hybrid solar collectors including photovoltaic cells may only be disposed on walls of the building having sufficient solar exposure to generate sufficient electrical energy to offset a capital cost of adding the photovoltaic cells to the solar collector. Other walls that may have sufficient solar radiation exposure for generating hot water may still not be economically feasible for mounting hybrid panels, which may have a higher capital cost than convention solar collectors.

Figure 16:
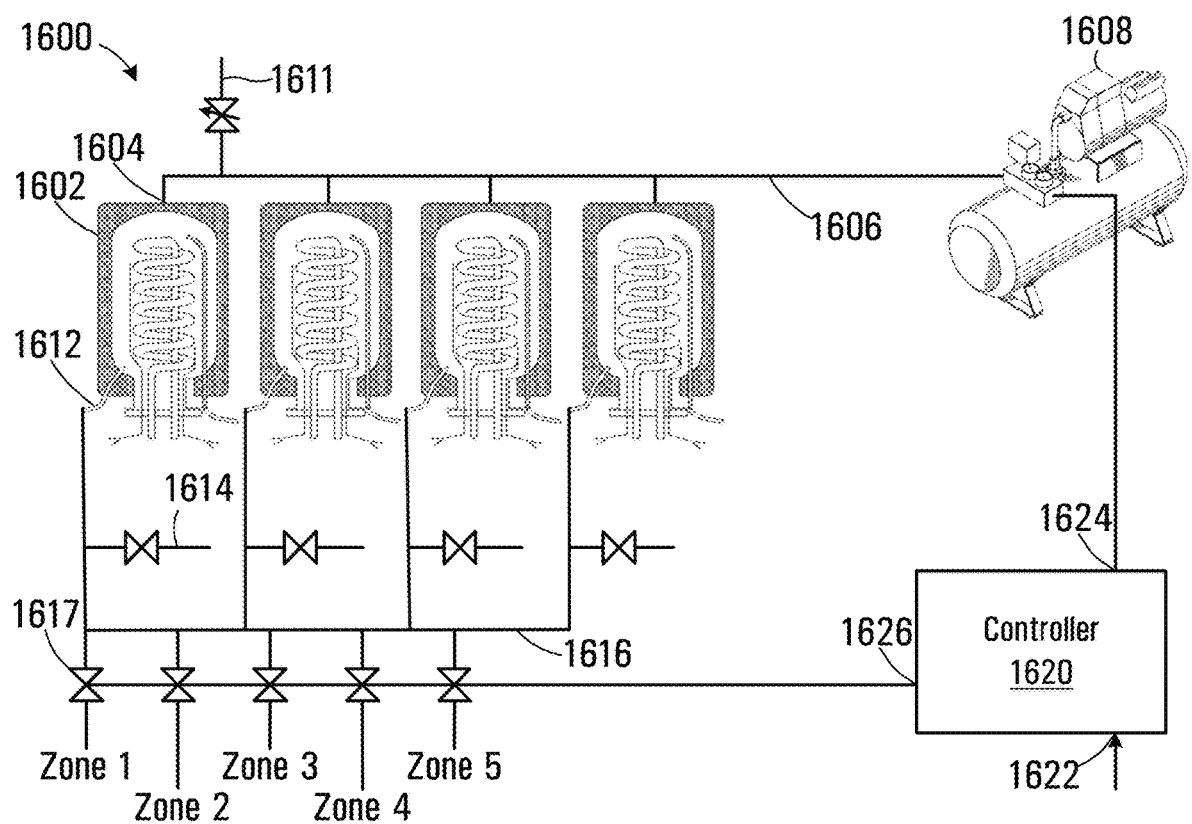
FIG. 16 is a schematic view of a sprinkler system for fire suppression in a multi-story building.
Figure 17:
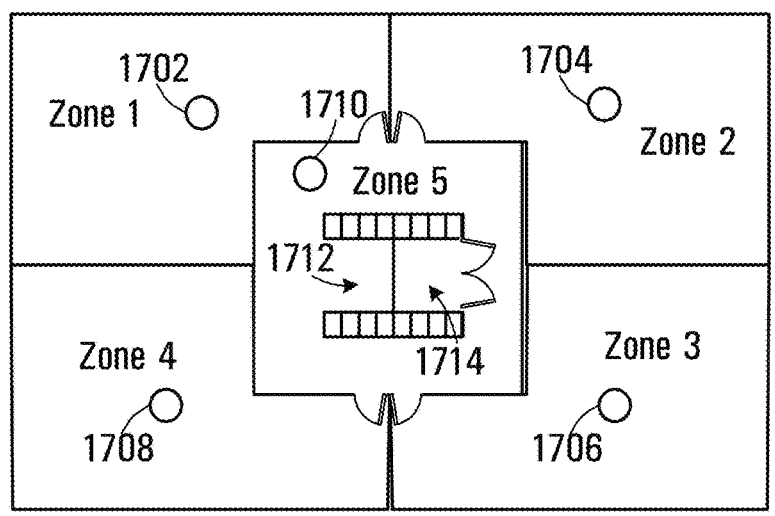
FIG. 17 is a plan view of a floor of a multi-story building.

Referring to FIG. 16 a fire sprinkler supply system for a building is shown generally at 1600. The fire sprinkler supply system 1600 includes four hot water vessels 1602 generally as described in connection with the hot water storage vessel 1300 shown in FIG. 13. In this embodiment each hot water vessel 1602 includes a pressurized air inlet 1604, which is in fluid communication with an air line 1606 connected to an air compressor 1608. An air vent 1611 is also connected to the air line 1606. Each hot water vessel 1602 has a cold water inlet 1612 in liquid communication with a cold water supply 1614. The cold water inlet 1612 is also in communication with a water manifold 1616 for supplying zones 1-5 of a sprinkler system via sprinkler supply valves 1617. The zones are shown in the context of a floor of a multi-story building in FIG. 17, each of the zones 1-4 being associated with one apartment on the floor of the building and the remaining zone 5 being associated with a common area including the elevator shaft 1712 and common system room 1714.

The fire sprinkler supply system 1600 uses water in the hot water vessels 1602, usually used to supply hot water for use in the building, for feeding the water manifold 1616. The system also includes in each zone, a fire detection sensor 1702-1710 operably configured to generate a fire condition signal in response to increased temperature caused by a fire condition in the building. A system controller 1620 includes a plurality of inputs 1622 for receiving the fire condition signal, and also includes an output 1624 for generating a signal to initiate operation of the air compressor 1608. The system controller 1620 further includes outputs 1626 for producing a sprinkler valve control signal for controlling the valves associated with the sprinkler zones 1-5. When the fire condition signal is received at one of the inputs 1622, the air compressor 1608 is activated to supply pressurized air to the pressurized air inlets 1604 and generates a signal at the output 1626 to open one sprinkler supply valves 1617 corresponding to the zone that produced the fire condition signal. The opening of the sprinkler supply valve 1610 places the sprinkler circuit associated with the zone in fluid communication with the water supply line and the cold water inlet of the hot water vessel. The air compressor supply pressurized air to the hot water vessel 1602 through the air inlet 1604 and causes water in the hot water vessel to be supplied through the cold water inlet and the water supply line to the sprinkler circuit via the sprinkler supply valve 1617. The hot water vessels 1602 have capacity to supply a greater flow of water to the fire sprinkler circuit than could be supplied by the cold water supply line alone for extinguishing the fire.

Although aspects of the present disclosure and its advantages have been described in detail, it should be understood that various changes, substitutions and alterations can be made herein without departing from the technology of the disclosure as defined by the appended claims. For example, relational terms, such as "above" and "below" are used with respect to other items in a given device. Of course, if devices are inverted because of particular applications, above becomes below, and vice versa. Additionally, if oriented sideways, above and below may refer to sides of a device. Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core), or any other such configuration.

The steps of a method or algorithm described in connection with the disclosure may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store specified program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

While specific embodiments have been described and illustrated, such embodiments should be considered illustrative of the invention only and not as limiting the invention as construed in accordance with the accompanying claims.

What is claimed is:

1. A system for supplying hot water to a plurality of apartments in a story of a multi-story building, the system comprising:
    a plurality of hot water vessels, each operable to supply hot water for use in an associated apartment on the story of the building, each hot water vessel having an inlet for receiving cold water and a heating coil for transferring heat to water within the hot water vessel;
    a solar collector disposed on a solar-facing wall of the building operable to transfer heat to a heating fluid in response to receiving solar radiation at the solar collector;
    a fluid circulating system operable to circulate the heating fluid between the solar collector and respective heating coils of each of the hot water vessels in the plurality of hot water vessels, the heating fluid being operable to heat water in each one of the plurality of hot water vessels for suppling hot water to the apartment associated with the respective hot water vessel;
    a heat exchanger disposed within one of the plurality of apartments, the heat exchanger including an outlet in liquid communication with the inlet of the hot water vessel associated with the apartment, the heat exchanger being operable to collect stagnant heat within the story of the building and to preheat cold water flowing through the heat exchanger for delivery to the inlet of the hot water vessel associated with the apartment;
    at least one cold water storage vessel having a cooling coil for transferring heat from the water within the cold water storage vessel to a fluid circulating between the cooling coil and the solar collector;
    wherein the solar collector is operably configured to transfer heat from the fluid through radiative cooling when solar radiation is not being received at the solar collector and wherein circulation of the fluid through the cooling coil causes cooling of the water in the cold water storage vessel; and
    a Rankin Organic Cycle energy generator having a working fluid, wherein the hot water supplied by the hot water vessel is used to cause evaporation of the working fluid and the water in the cold water storage vessel is used to cause condensation of the working fluid for operating the Rankin Organic Cycle energy generator to generate mechanical energy, the mechanical energy being coupled to an electrical generator for generating electrical energy.

2. The system of claim 1 wherein the heat exchanger is disposed to receive stagnant heat generated by heating devices that provide heating within the associated apartment on the story of the building.

3. The system of claim 2 wherein the heat exchanger is disposed on one of a ceiling and a ceiling plenum of the one of the plurality of apartments and disposed to receive rising stagnant heat from the heating devices.

4. The system of claim 1 wherein the solar collector is disposed on one of:
    a solar facing wall associated with the story of the building; and
    a solar facing wall associated with another portion of the building.

5. The system of claim 1 wherein the solar collector further comprises photovoltaic cells operably configured to generate electrical energy and further comprising an electrical energy distribution system for distributing electrical energy generated by the solar collector to the benefit of each apartment in the plurality of apartments.

6. The system of claim 5 wherein the electrical energy distribution system is operably configured to:
    distribute the electrical energy between the plurality of apartments for use in each apartment; and
    distribute the electrical energy to an electrical supply utility for an economic benefit, the economic benefit being shared between the plurality of apartments.

7. The system of claim 5 wherein a plurality of solar collectors are disposed on solar facing walls of the building and wherein solar collectors comprising photovoltaic cells are only disposed on walls of the building having sufficient solar exposure to generate electrical energy.

8. A system for supplying hot water to a plurality of apartments in a story of a multi-story building, the system comprising:
    a plurality of hot water vessels, each operable to supply hot water for use in an associated apartment on the story of the building, each hot water vessel having an inlet for receiving cold water and a heating coil for transferring heat to water within the hot water vessel;
    a heat exchanger disposed within one of the plurality of apartments, the heat exchanger including an outlet in liquid communication with the inlet of the hot water vessel associated with the apartment, the heat exchanger being operable to collect stagnant heat within the story of the building and to preheat cold water flowing through the heat exchanger for delivery to the inlet of the hot water vessel associated with the apartment;
    wherein the story of the building comprises a common area, and further comprising:
        a split air conditioner comprising an external unit within the common area and an internal cooler within at least one of the plurality of apartments, and wherein the heat exchanger is disposed in the common area and the stagnant heat comprises excess heat provided during operation of the external unit of the split air conditioner.

9. The system of claim 8 wherein the plurality of hot water vessels are also disposed within the common area.

10. The system of claim 8 wherein each story of the building comprises a common area housing the external unit of the split air conditioner, the heat exchanger, and the plurality of hot water vessels, each hot water vessel being operable to supply hot water to respective apartments on the same story of the building.

11. The system of claim 8 further comprising:
a solar collector disposed on a solar-facing wall of the building;
a cold water storage vessel having a cooling coil for transferring heat from the water within the cold water storage vessel to a fluid circulating between the cooling coil and the solar collector, and wherein:
the solar collector is operably configured to transfer heat from the fluid through radiative cooling when solar radiation is not being received at the solar collector and wherein circulation of the fluid through the cooling coil causes cooling of the water in the cold water storage vessel; and
cooled water in the cold water storage vessel is used to provide cooling for an air intake of an internal unit of an air conditioner.

12. A system comprising:
a hot water supply system for supplying a plurality of apartments in a story of a multi-story building, the hot water supply system comprising:
a plurality of hot water vessels, each operable to supply hot water for use in an associated apartment on the story of the building, each hot water vessel having an inlet for receiving cold water and a heating coil for transferring heat to water within the hot water vessel;
a solar collector disposed on a solar-facing wall of the building operable to transfer heat to a heating fluid in response to receiving solar radiation at the solar collector;
a fluid circulating system operable to circulate the heating fluid between the solar collector and respective heating coils of each of the hot water vessels in the plurality of hot water vessels, the heating fluid being operable to heat water in each one of the plurality of hot water vessels for suppling hot water to the apartment associated with the respective hot water vessel;
a heat exchanger disposed within one of the plurality of apartments, the heat exchanger including an outlet in liquid communication with the inlet of the hot water vessel associated with the apartment, the heat exchanger being operable to collect stagnant heat within the story of the building and to preheat cold water flowing through the heat exchanger for delivery to the inlet of the hot water vessel associated with the apartment;
a fire sprinkler supply system for the multi-story building, at least one of the hot water vessels including an air inlet in fluid communication with the hot water vessel, the cold water inlet of the hot water vessel being connected to a cold water supply line, and wherein the fire sprinkler supply system comprises:
at least one fire sprinkler circuit connected to the cold water supply line via a sprinkler supply valve;
a fire detection sensor operably configured to generate a fire condition signal in response to increased temperature caused by a fire condition in the building, the fire condition signal being operable to open the sprinkler supply valve to place the sprinkler circuit in fluid communication with the cold water supply line and the cold water inlet of the hot water vessel; and
an air compressor operably configured to selectively supply pressurized air to the hot water vessel through the air inlet in response to receiving the fire condition signal from the fire detection sensor, the pressurized air being operable to cause water in the hot water vessel to be supplied through the cold water inlet and the water supply line to the sprinkler circuit via the sprinkler supply valve, the hot water vessel having capacity to supply a greater flow of water to the fire sprinkler circuit than could be supplied by the cold water supply line.

\* \* \* \* \*